(12) United States Patent
Paulsen

(10) Patent No.: US 10,328,472 B2
(45) Date of Patent: Jun. 25, 2019

(54) BATTERY TRAY PROFILE FOR A BATTERY TRAY

(71) Applicant: Benteler Automobiltechnik GmbH, Paderborn (DE)

(72) Inventor: Frode Paulsen, Gjøvik (NO)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 16/046,125

(22) Filed: Jul. 26, 2018

(65) Prior Publication Data

US 2019/0031044 A1 Jan. 31, 2019

(30) Foreign Application Priority Data

Jul. 26, 2017 (DE) .................. 10 2017 116 957

(51) Int. Cl.
*B21C 23/00* (2006.01)
*B21C 23/14* (2006.01)
*B60L 11/18* (2006.01)

(52) U.S. Cl.
CPC ........ *B21C 23/142* (2013.01); *B60L 11/1879* (2013.01)

(58) Field of Classification Search
CPC ...... B60K 1/04; B60L 11/1879; B21C 23/142
See application file for complete search history.

(56) References Cited

U.S. PATENT DOCUMENTS 9,073,498 B2 * 7/2015 Lee .................. B60R 16/04
2005/0152774 A1 7/2005 Pierce et al.

FOREIGN PATENT DOCUMENTS

DE 10 2010 033 123 A1 2/2012
JP 08058617 A 3/1996

* cited by examiner

*Primary Examiner* — James A Shriver, II
*Assistant Examiner* — James J Triggs
(74) *Attorney, Agent, or Firm* — Holland & Hart LLP

(57) ABSTRACT

The disclosure describes a battery tray profile for a battery tray that holds at least one electric battery module of a vehicle. The battery tray profile includes a base plate configured to receive the at least one electric battery module, wherein the base plate comprises at least one extruded curve; and a hollow chamber wall that rises from the base plate and is integrally extruded with the base plate. The disclosure also describes a method for producing a battery tray profile for a battery tray, including extruding a base plate for receiving the electric battery module; extruding at least one curve in the base plate; extruding a hollow profile wall that rises from the base plate and is integrally extruded with the base plate; and obtaining the battery tray profile from the extruding of the base plate and the hollow profile wall during an extrusion process.

19 Claims, 28 Drawing Sheets

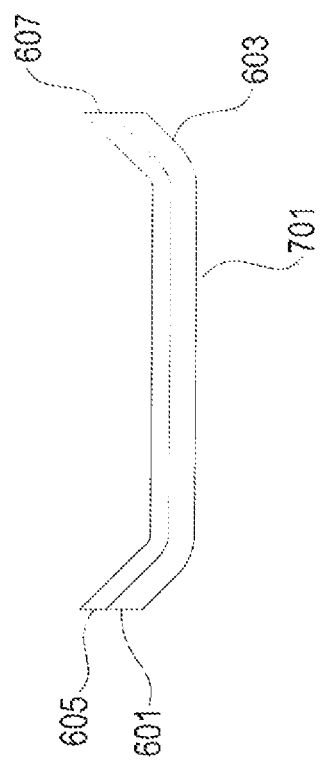
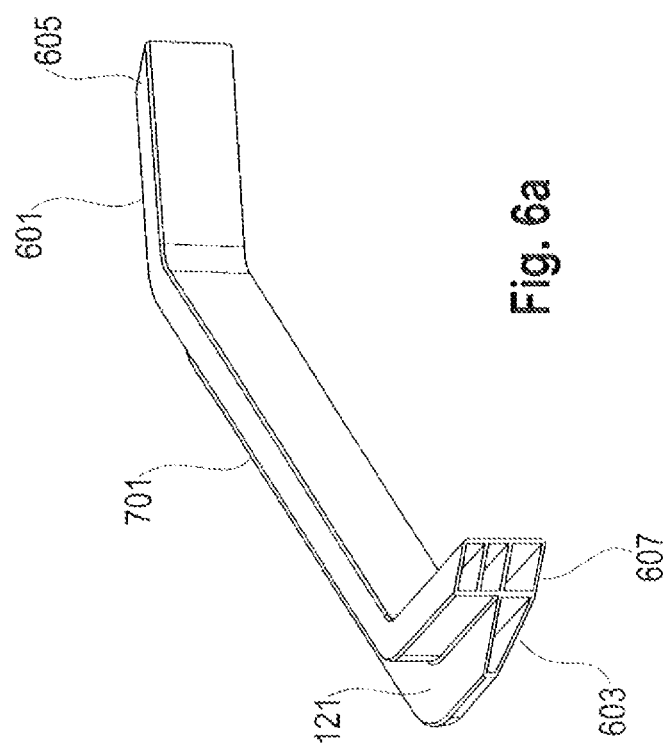

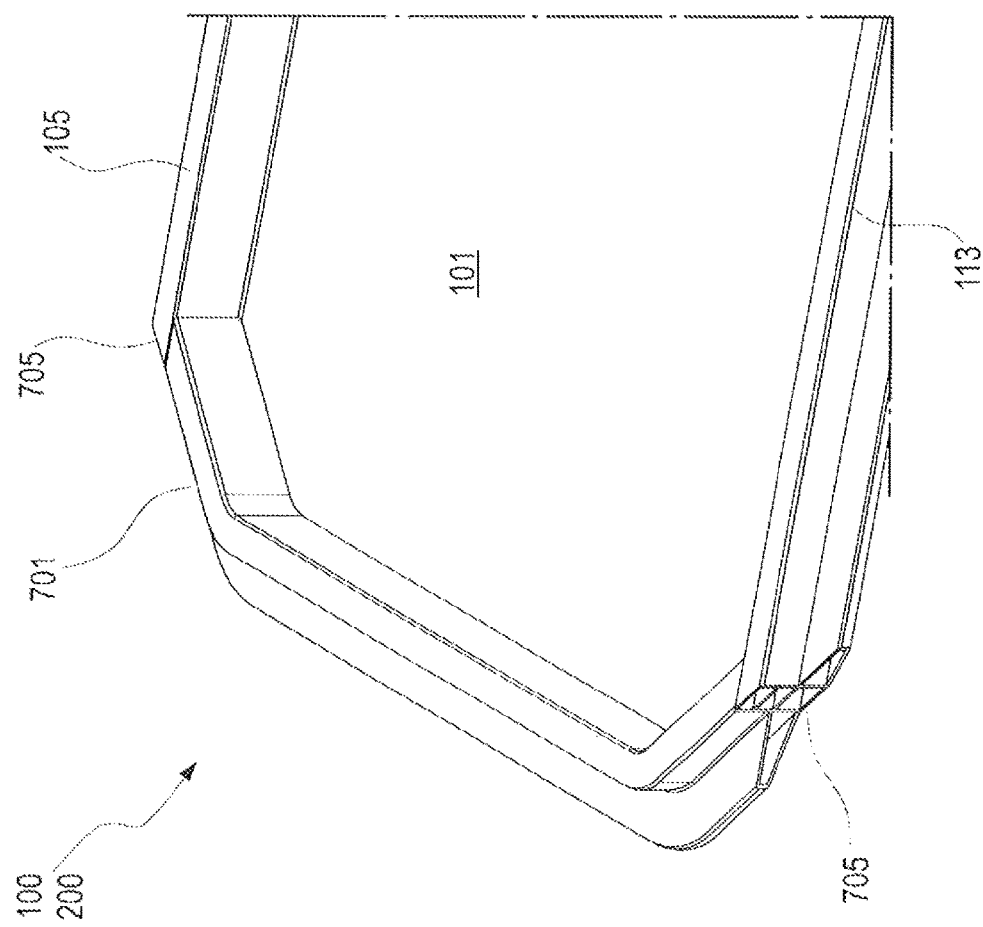

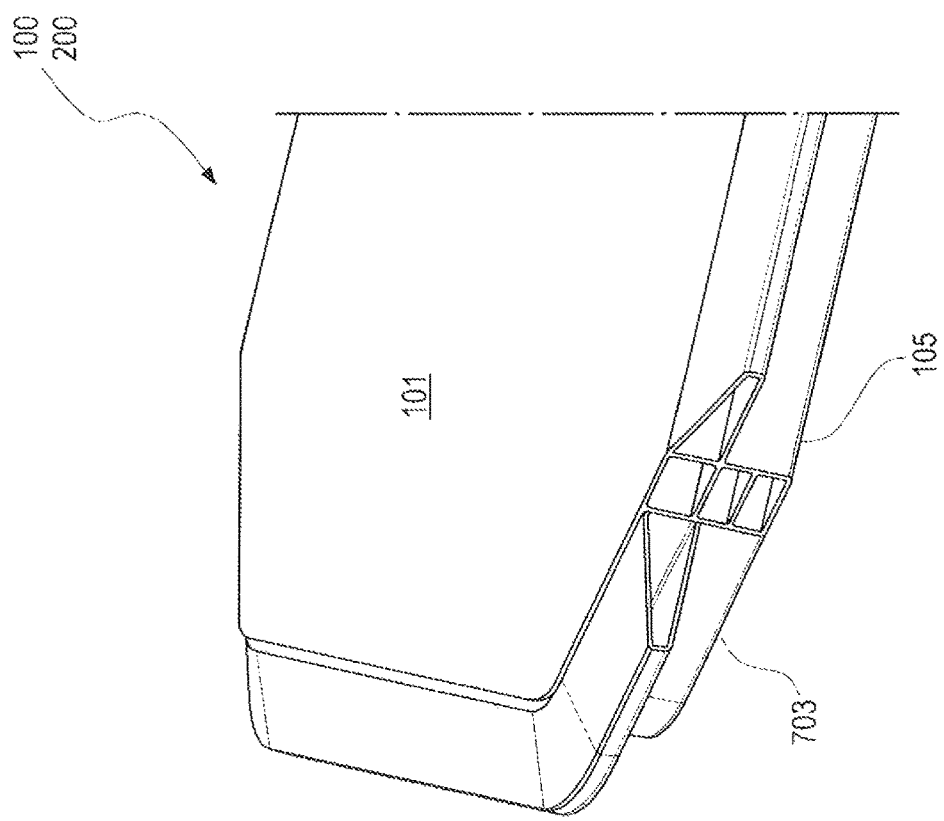

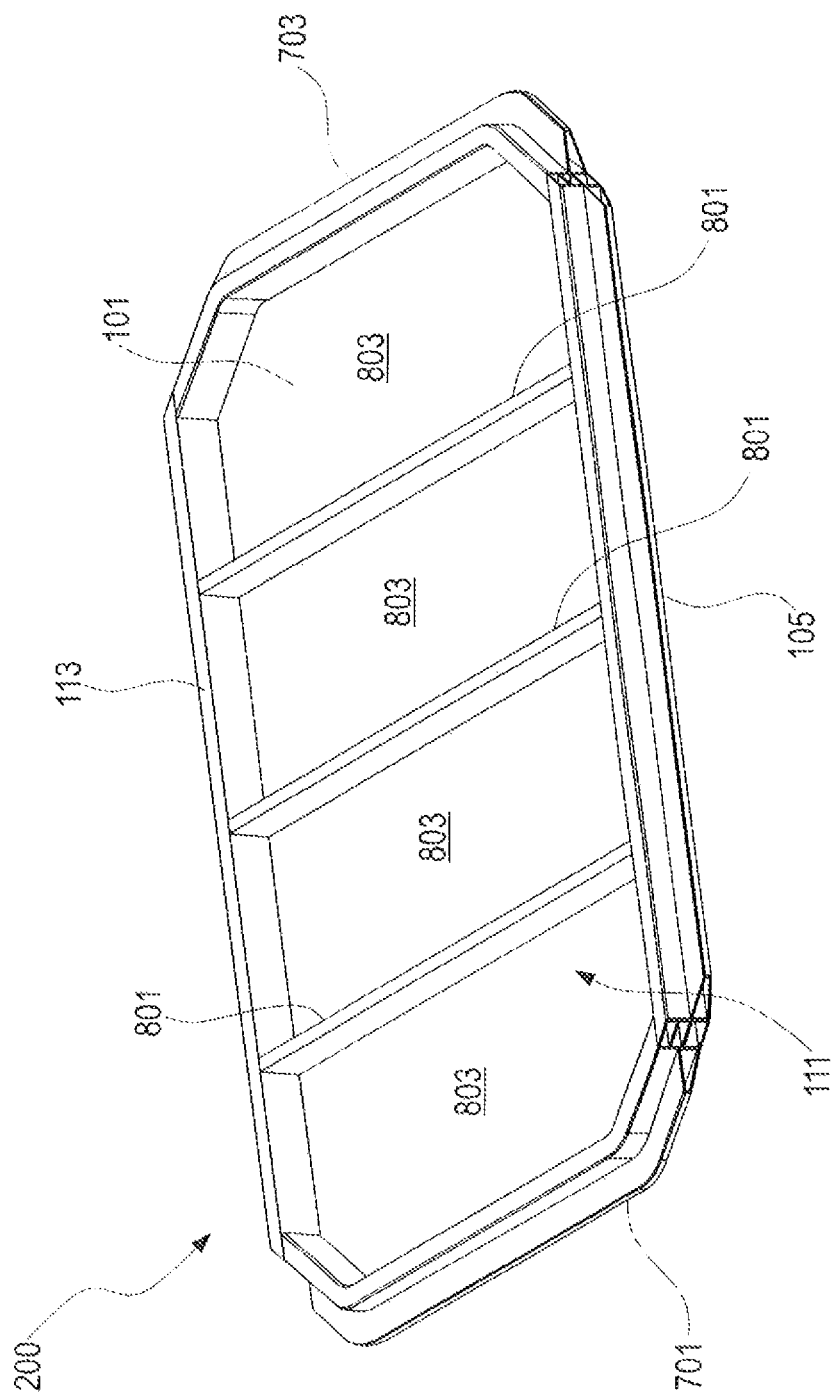

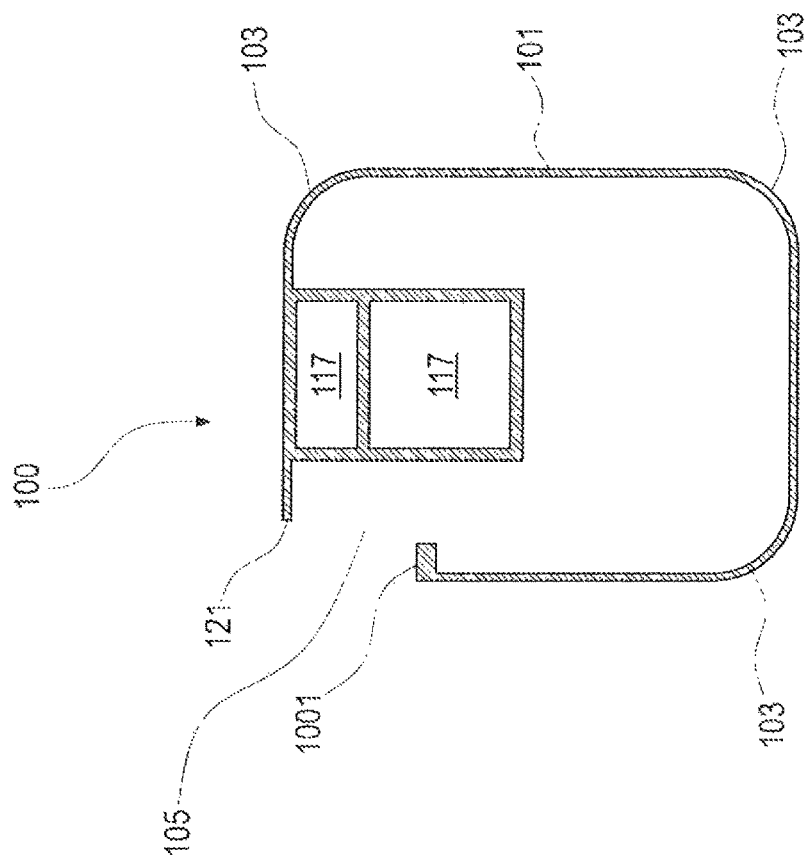

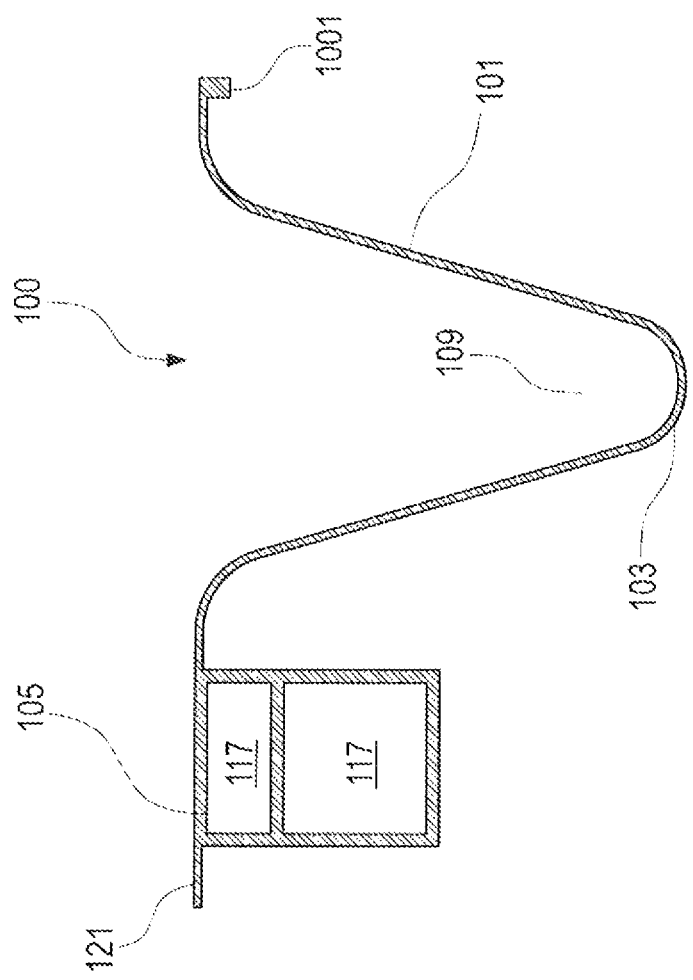

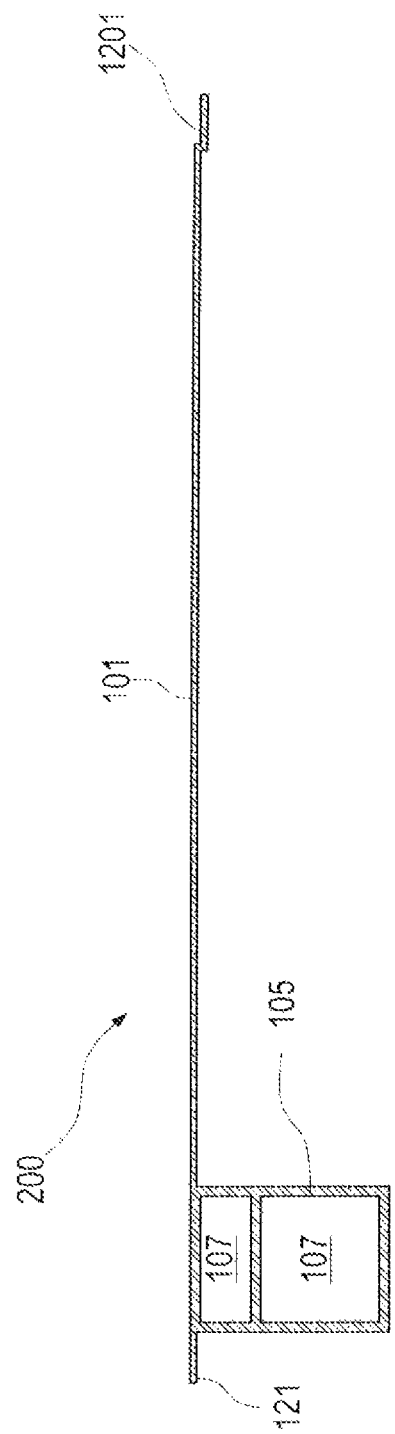

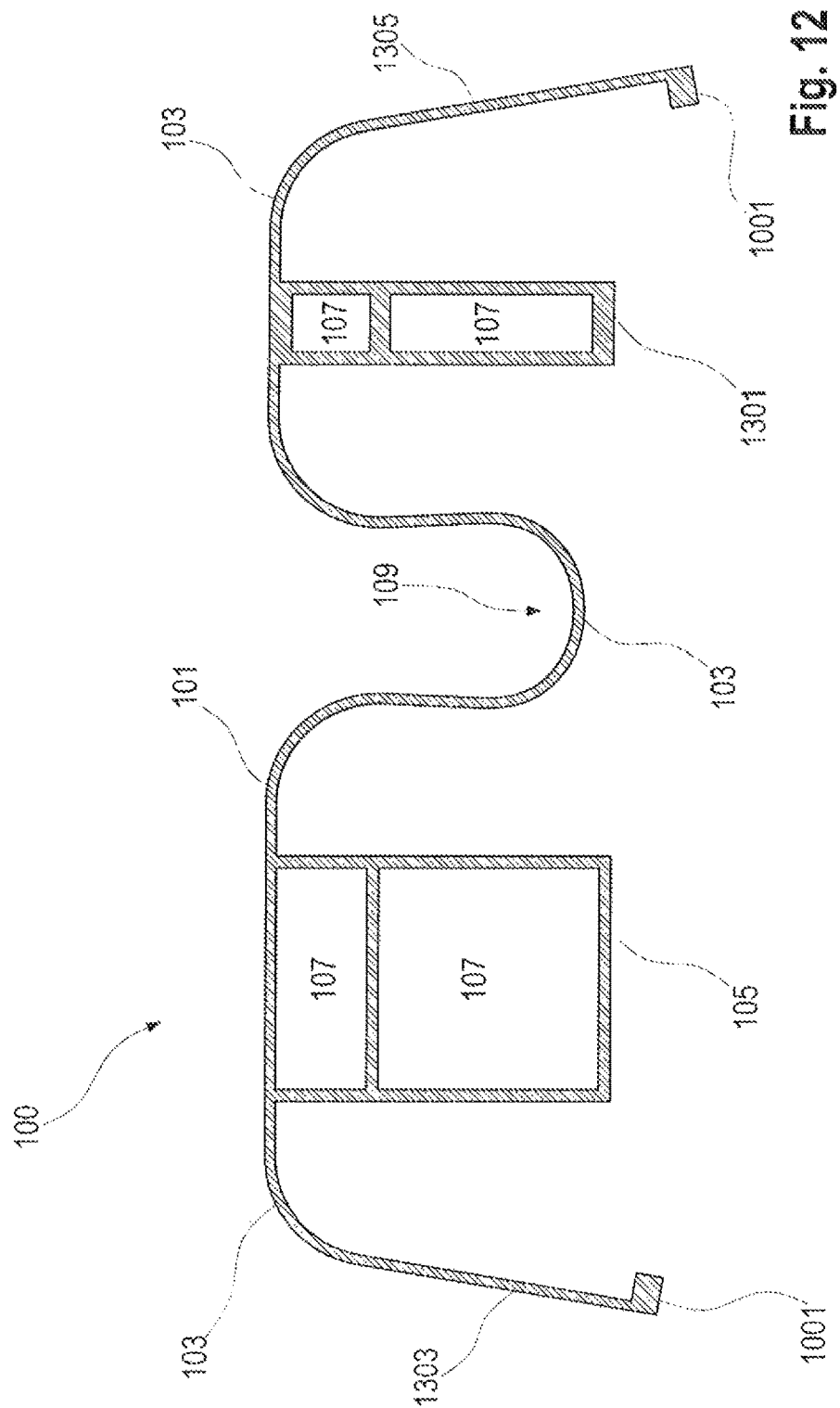

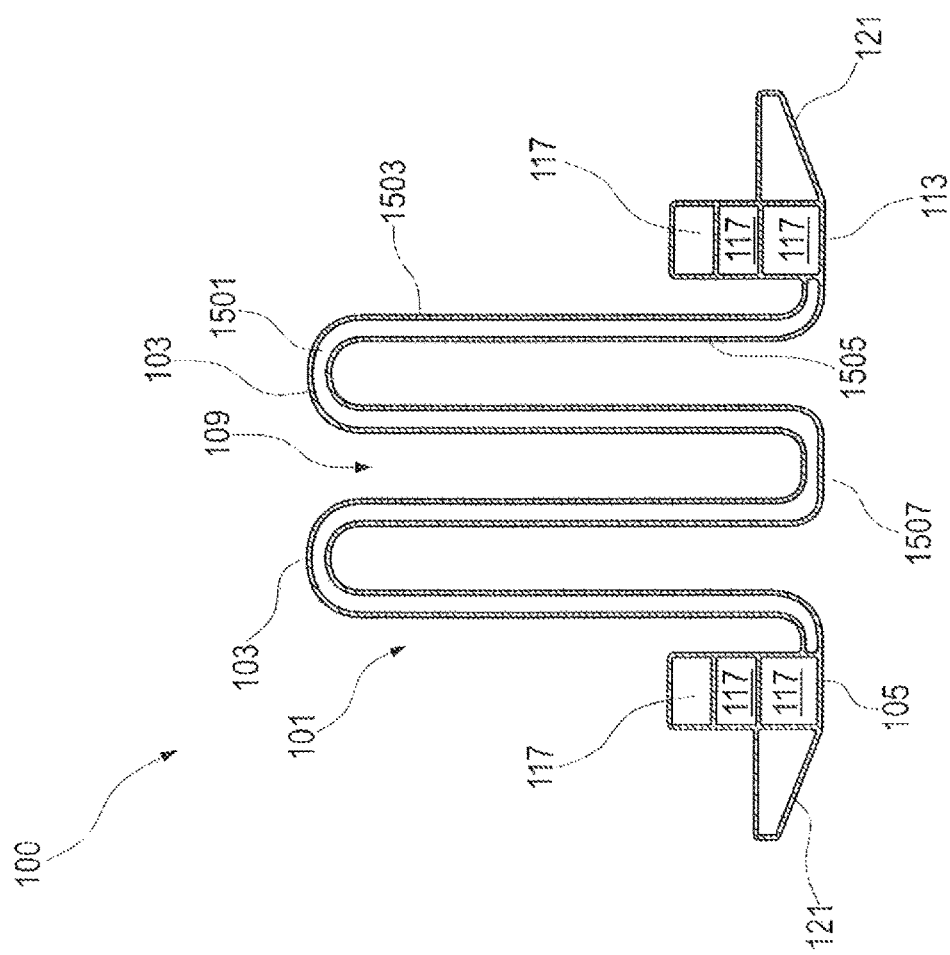

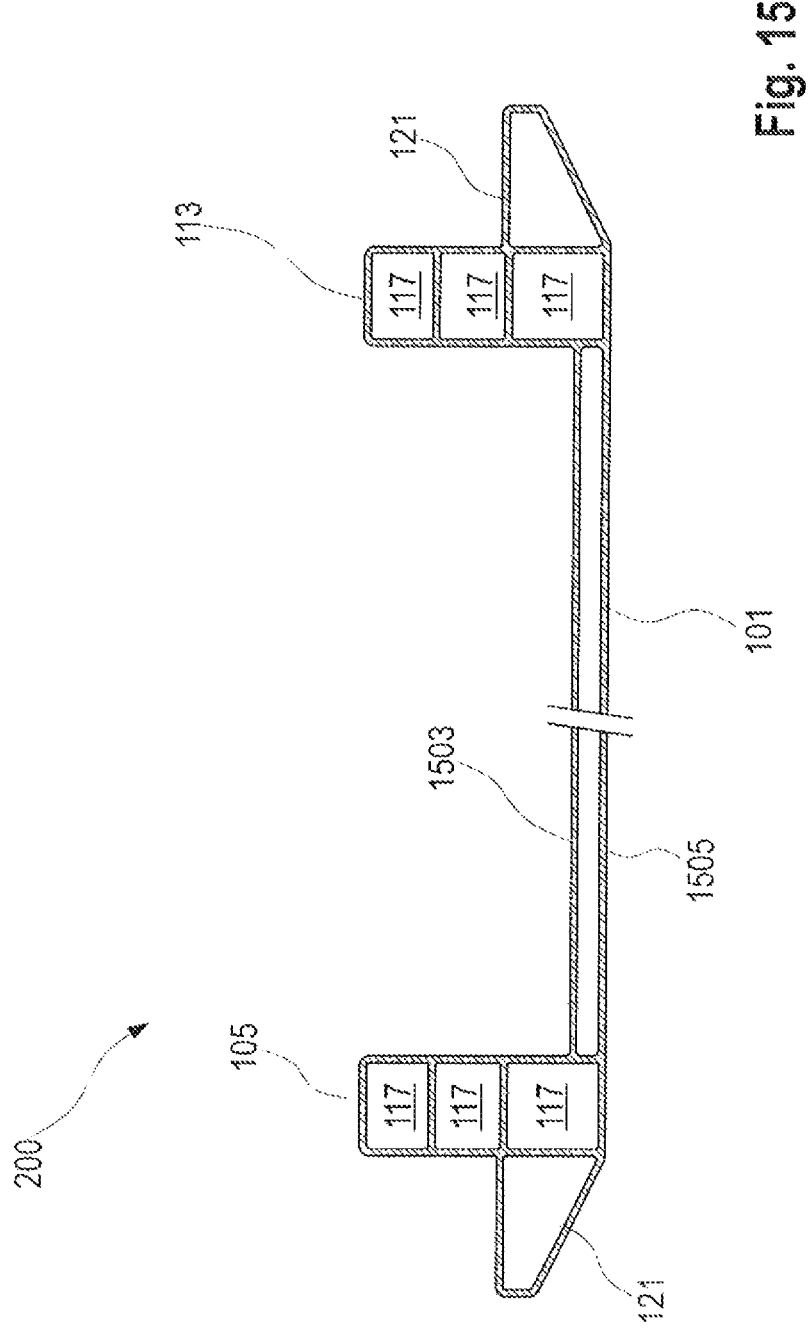

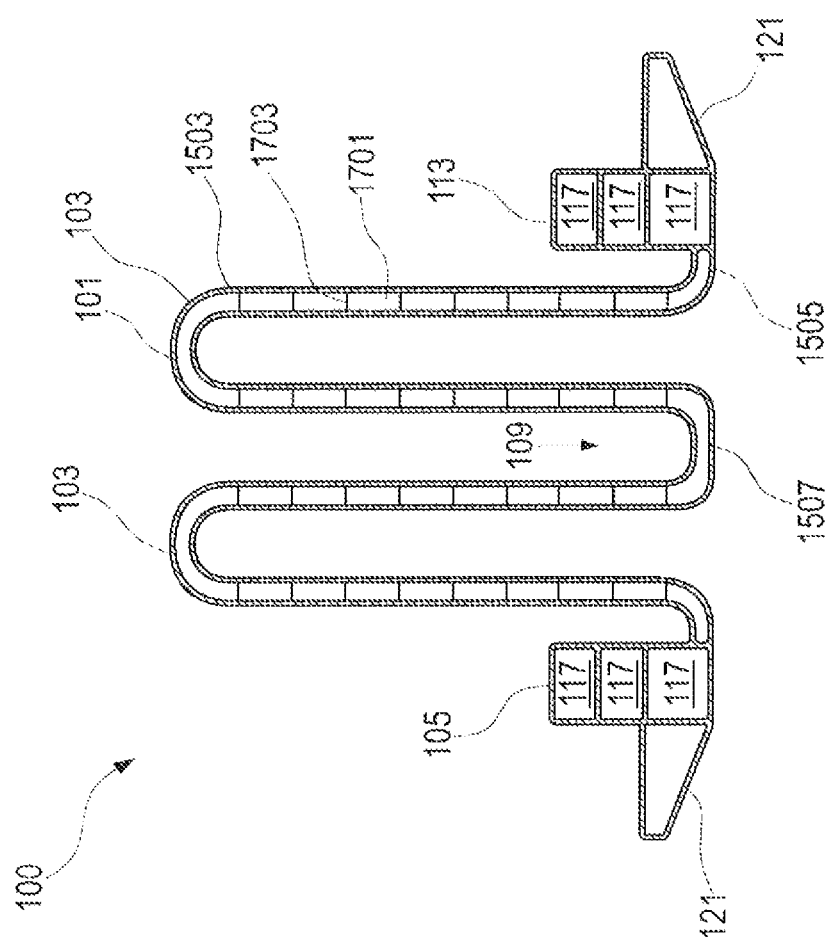

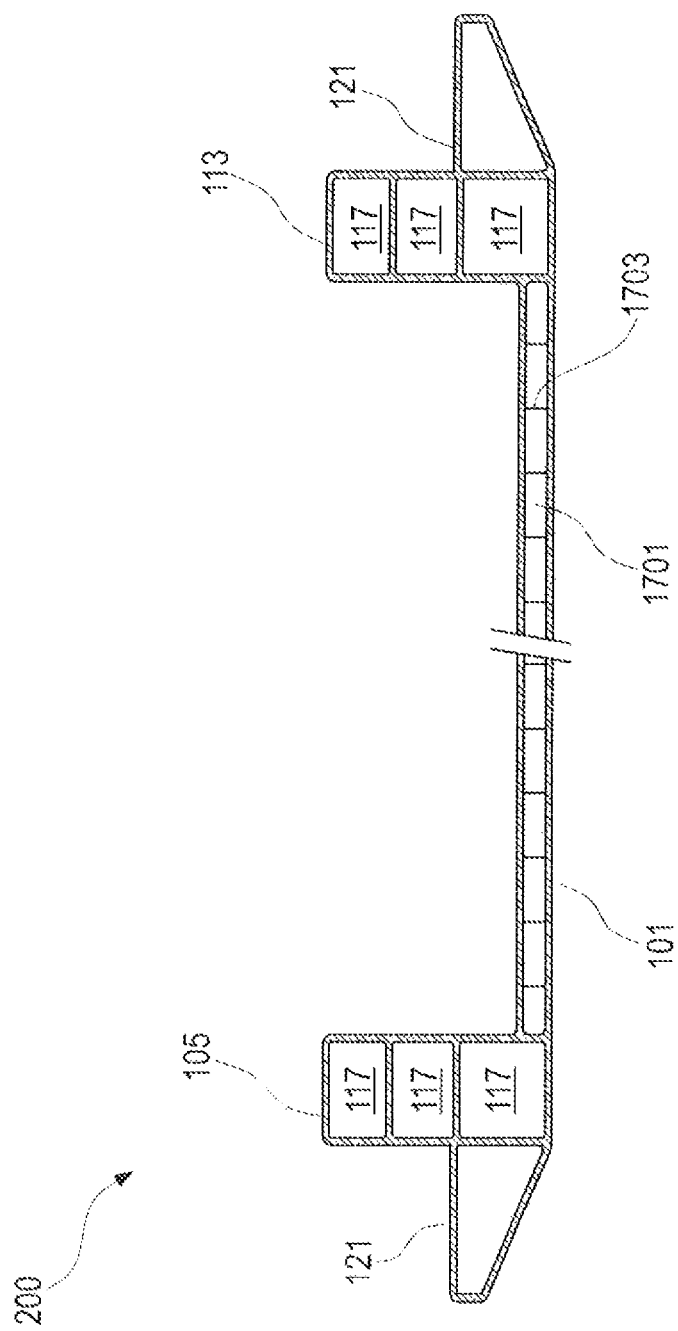

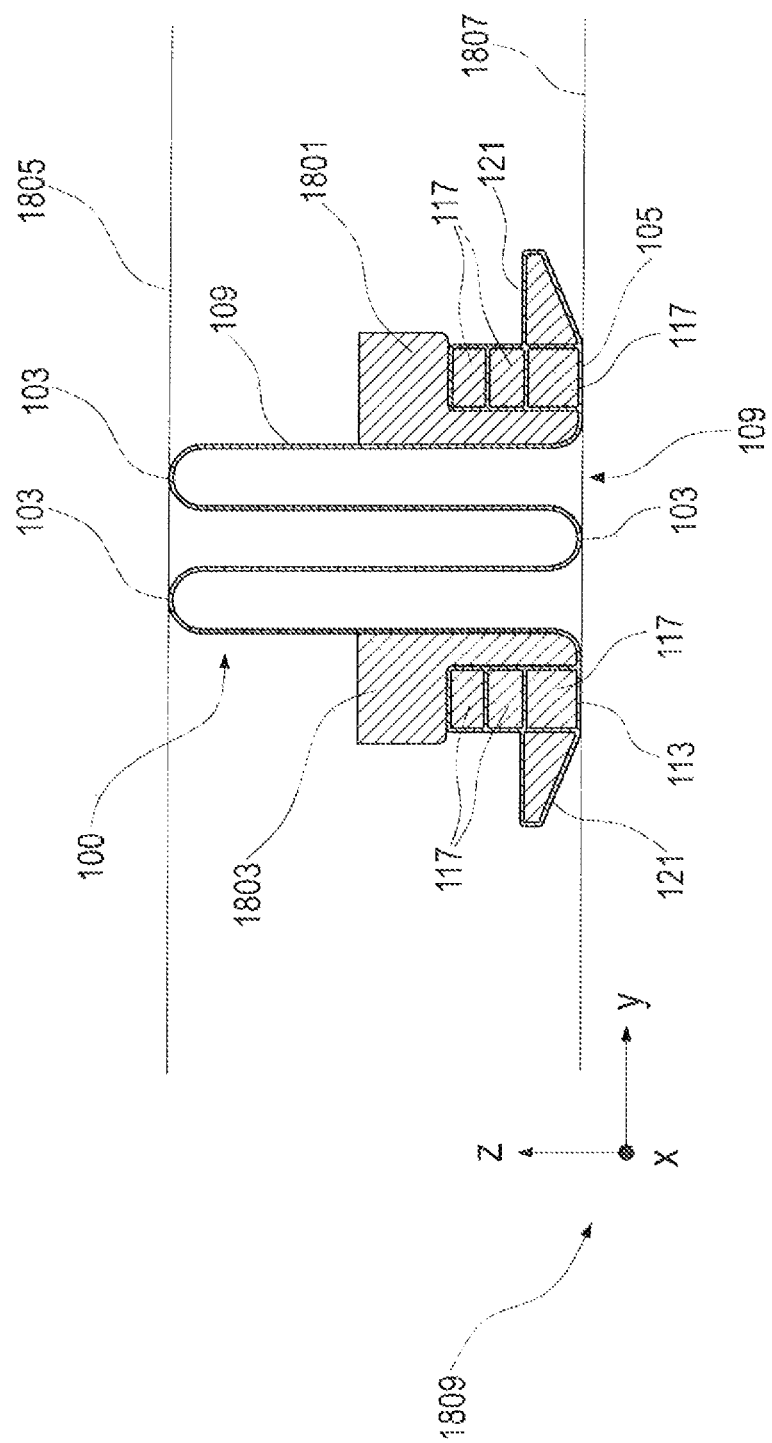

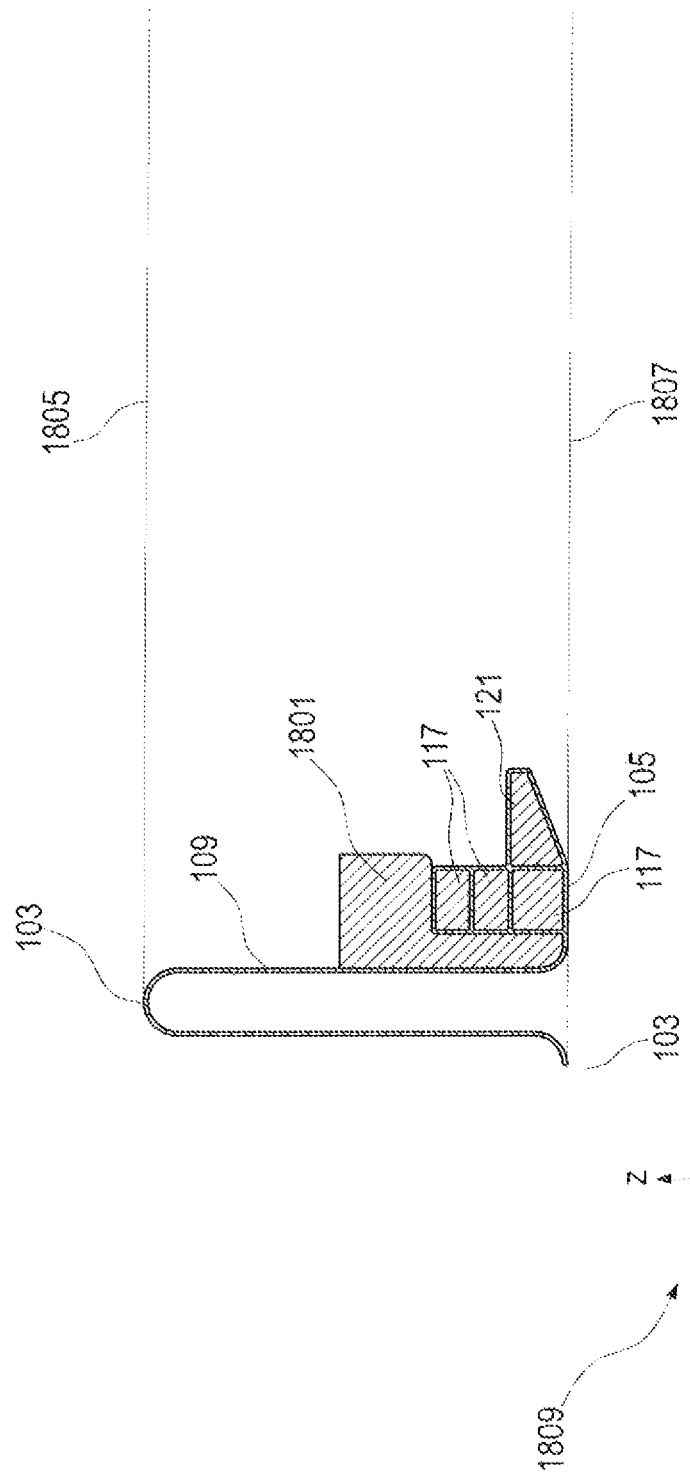

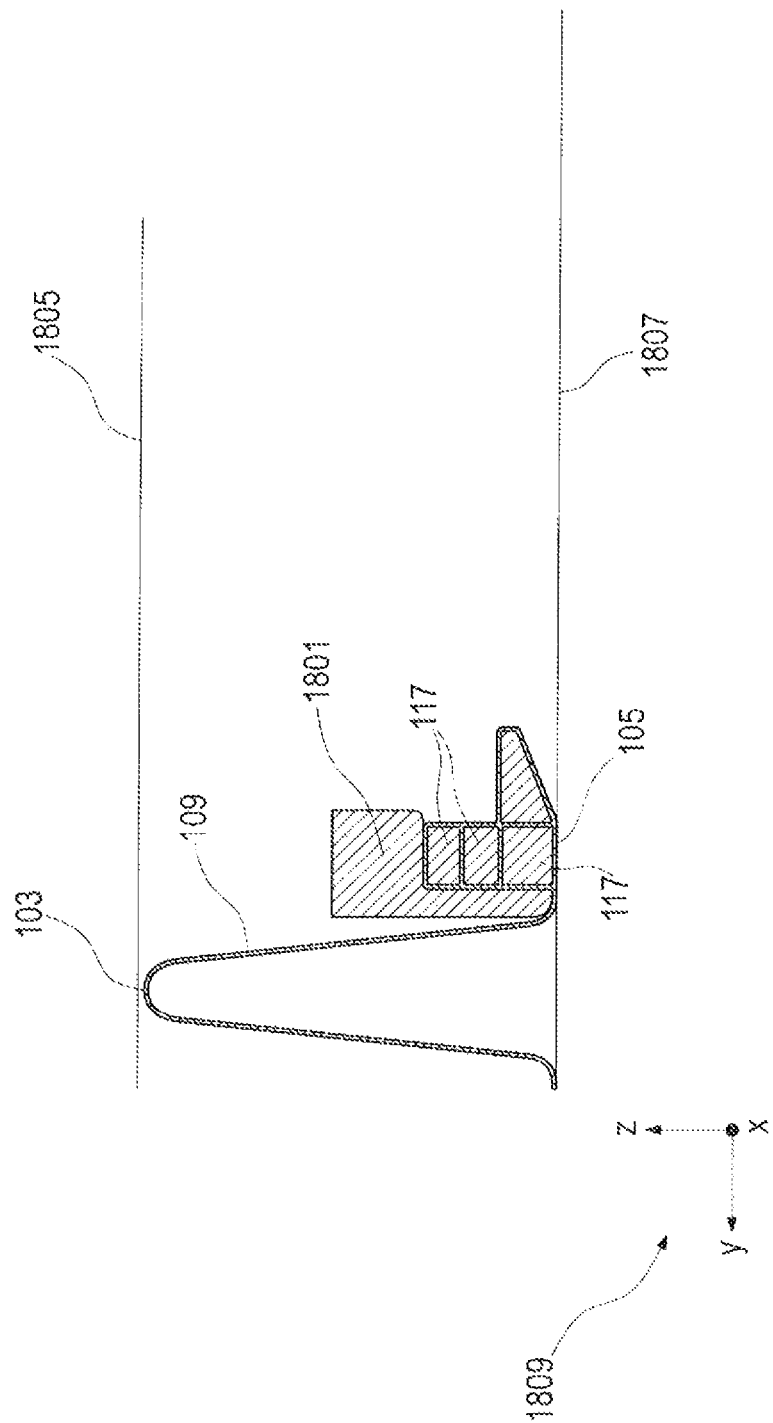

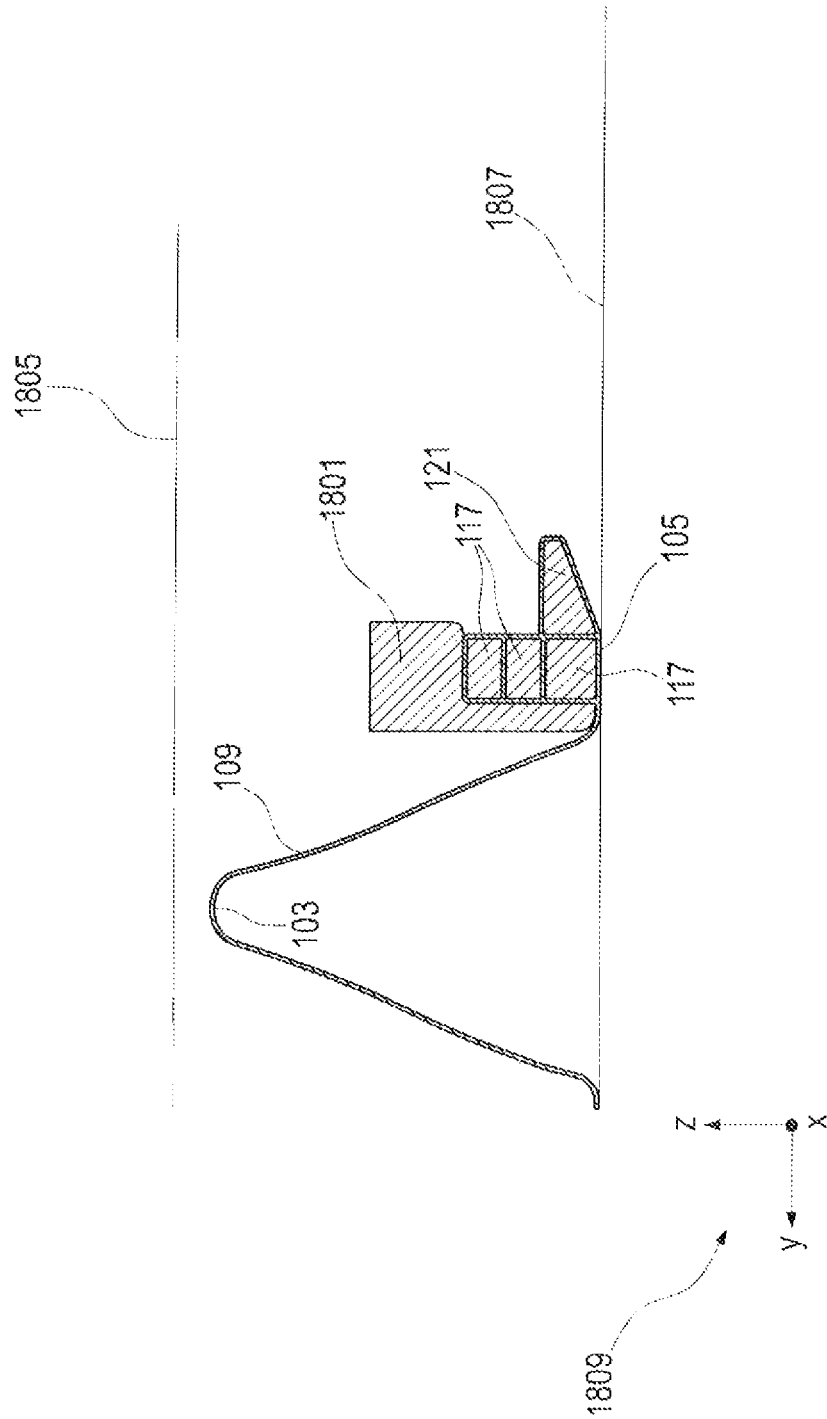

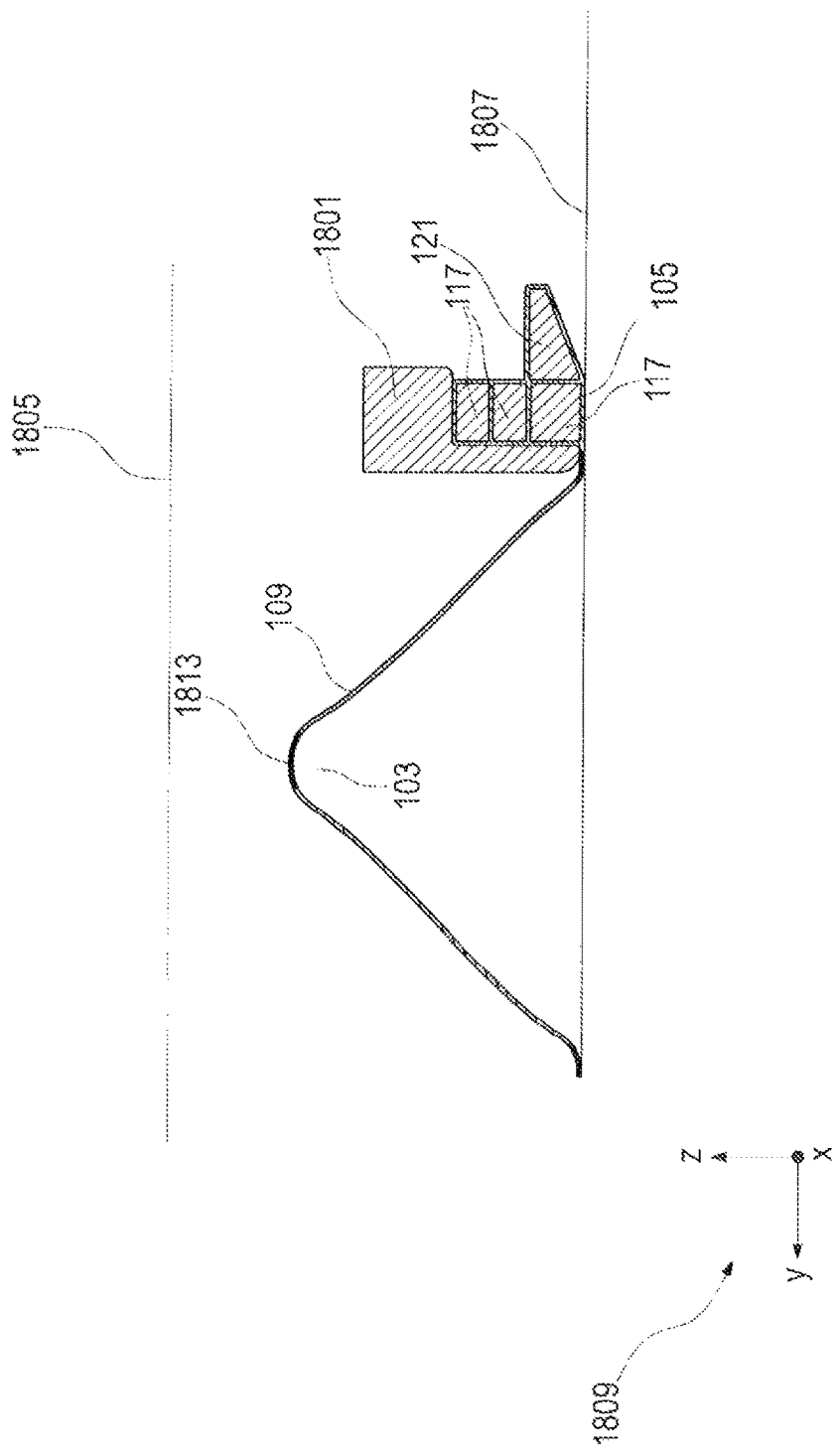

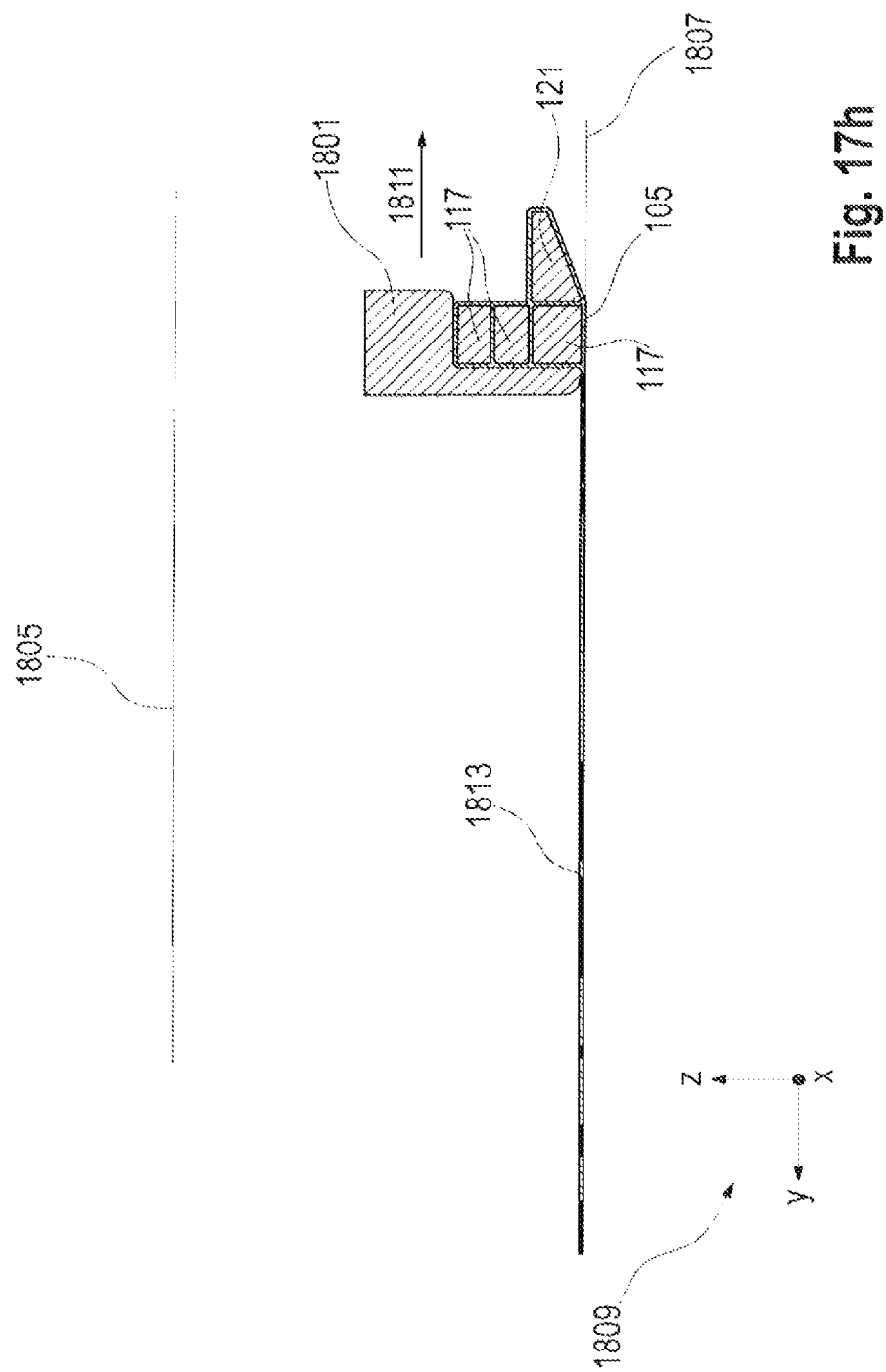

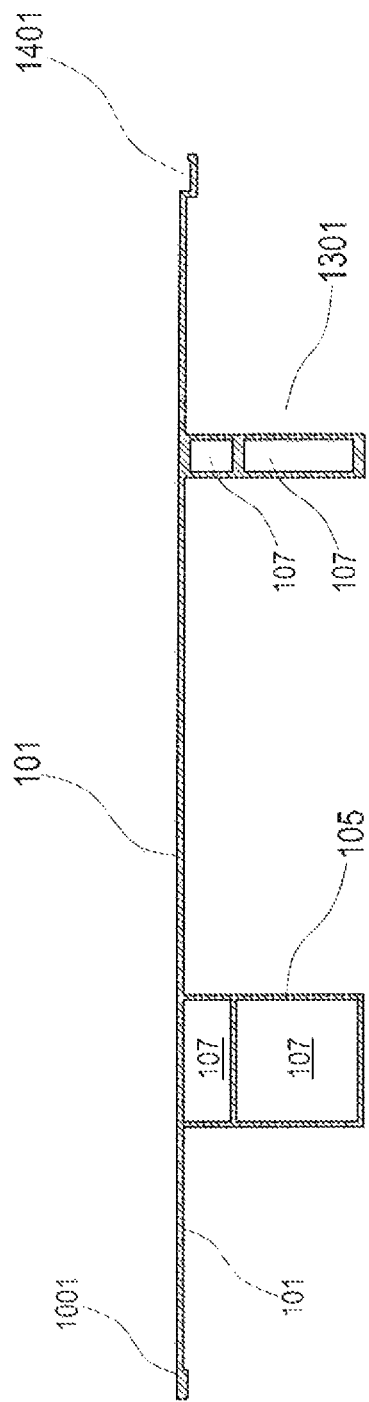

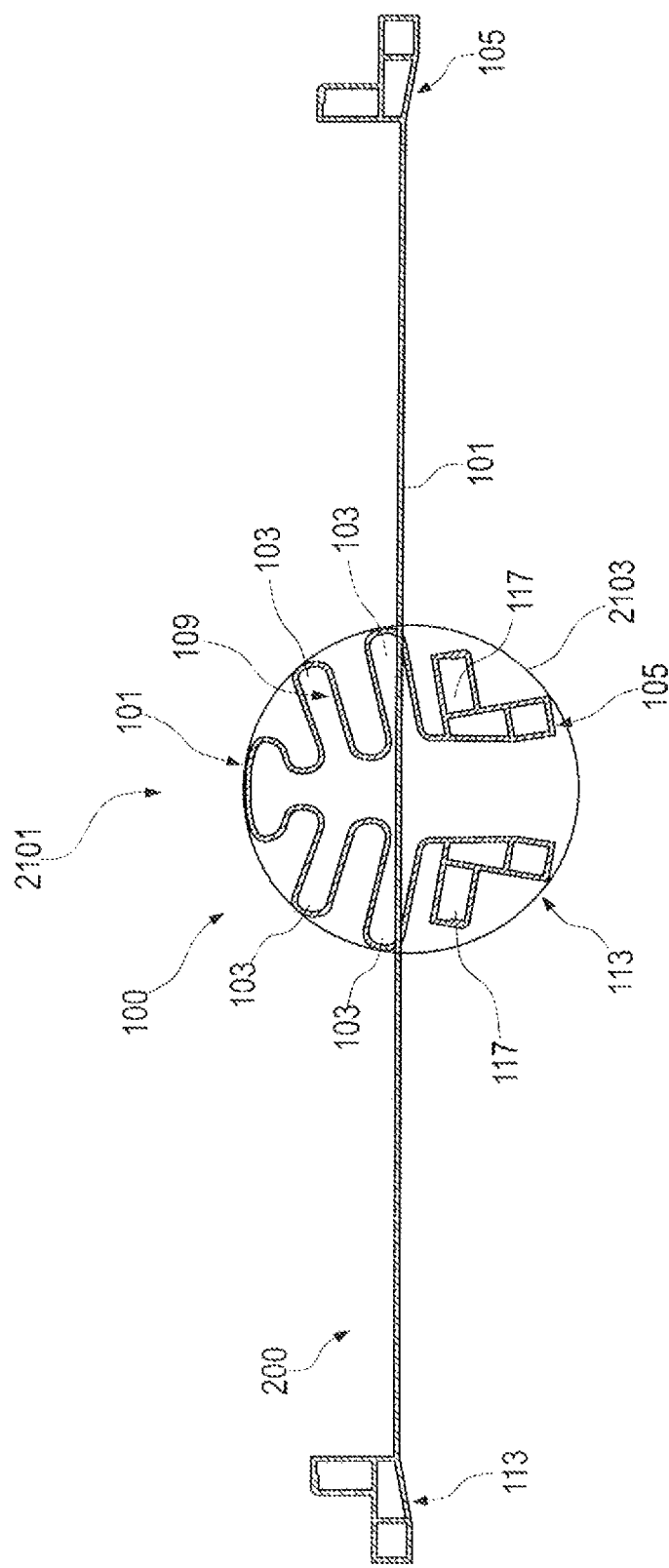

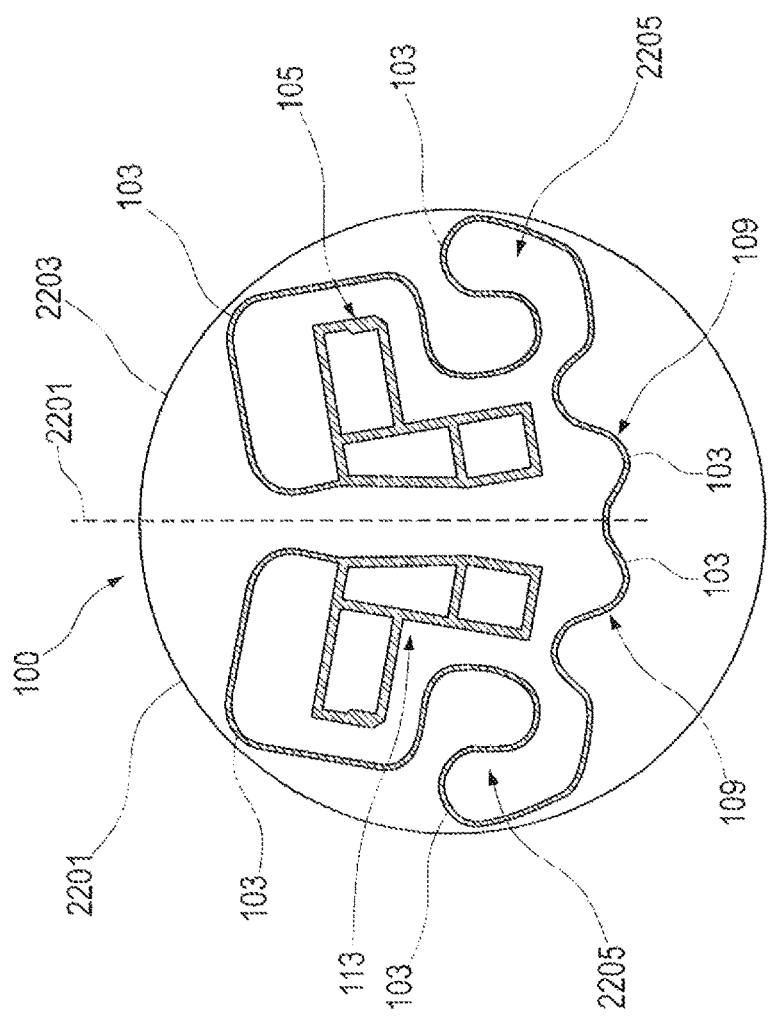

BATTERY TRAY PROFILE FOR A BATTERY TRAY

CROSS-REFERENCE TO RELATED APPLICATIONS

This application claims priority to German patent application No. 10 2017 116 957.1, entitled "Batterieträgerprofil für einen Batterieträger", and filed on Jul. 26, 2017 by the Applicant of this application. The entire disclosure of the German application is incorporated herein by reference for all purposes.

BACKGROUND

The present disclosure relates to a battery tray for receiving at least one electric battery module in a vehicle, in particular in a motor vehicle.

In order to hold the at least one electric battery module for providing electrical energy in electrically driven vehicles, battery trays which are arranged between the axles of the vehicle are typically used.

The greater the number of battery modules, the greater the space requirement for receiving the battery modules in the battery tray. However, the production of battery trays having a sufficiently large surface area, for example by means of extrusion, is complex and expensive.

DE 10 2012 100 977 B3 discloses an efficient solution to the above-mentioned problem by using profile elements that are positively interconnected in order to obtain a base plate of a battery tray for receiving battery modules.

SUMMARY

The object of the present disclosure is to specify a way in which efficient production of a battery tray having a large surface area and comprising a base plate for holding battery modules in electrically drivable vehicles can be achieved.

This object is achieved by the features of the independent claims. Advantageous developments are the subject matter of the dependent claims, of the following description and of the accompanying drawings.

The present disclosure is based on the knowledge that the above object can be achieved by means of a battery tray profile that can be provided as a semi-finished product or intermediate product for producing a battery tray.

The battery tray profile comprises a base plate having an extruded curve. For this purpose, the base plate may for example comprise a plurality of extruded folds or waves that extend in parallel with one another, or are bent. As a result, the base plate can be produced by means of extrusion such that less space is required for processing.

By stretching the curve, the base plate can, for example, be stretched lengthwise or widthwise, as a result of which a battery tray comprising the receiving surface provided for the battery modules is obtained.

By stretching the curve, the base plate is, for example, elongated, as a result of which the outside of the curve is compressed and the inside thereof stretched.

The curve can be stretched mechanically, the base plate for example being clamped and drawn out.

The curve can be stretched completely, as a result of which a flat surface for mounting the battery modules is obtained for the base plate. However, it is also possible for the curve to be undone only in part, such that a residual curve remains after the base plate is stretched. The residual curve can contribute to increasing the rigidity of the base plate.

According to a first aspect, the disclosure relates to a battery tray profile for a battery tray for holding at least one electric battery module of a motor vehicle, said battery tray profile comprising: a base plate for receiving the electric battery module, the base plate comprising at least one extruded curve, the extruded curve being stretchable; and a hollow chamber wall, which rises from the base plate and is integrally formed, in particular extruded, with the base plate.

The hollow chamber wall can be formed as an intermediate wall or as a side wall. In this way, advantageous features of the battery tray can be extruded with the battery tray profile, which reduces the production costs with regard to logistics costs and assembly outlay of the battery tray.

In one example, the hollow chamber walls are arranged on opposing portions, in particular on opposing edges, of the base plate, and laterally delimit the base plate.

However, the hollow chamber walls may be arranged at an angle to one another, in particular at a right angle.

In one example, the extruded curve can be stretched in order to obtain a flat receiving surface for the electric battery module. The stretching can be carried out mechanically by means of plastic deformation of the formed base plate.

In one example, the base plate comprises at least one extruded fold comprising the curve, the extruded fold being stretchable, the base plate being curved into an arc shape, in particular into the shape of an arc of a circle. In this way, the space requirement for production of the battery tray module can be further reduced. The fold can be extruded as a wave or warpage of the base plate.

In one example, the base plate comprises a plurality of extruded, parallel folds each comprising a curve. The folds can be extruded in the shape of a wave front having parallel wave fronts, such that the folds can be unfolded or stretched in the same direction in each case. In particular, the folds have the same height and/or length.

In one example, the hollow chamber wall comprises a receiving region on the base plate for receiving the electric battery module, the hollow chamber wall laterally delimiting the base plate, in particular as a side frame.

In one example, the battery tray profile comprises an additional hollow chamber wall, which rises from the base plate or laterally delimits the base plate or divides a base plate surface, the hollow chamber wall and the additional hollow chamber wall being arranged on opposing portions, in particular on opposing edges, of the base plate or arranged at an angle to one another, in particular at a right angle. As a result, a frame of the battery tray can be co-extruded at least in portions.

In one example, each hollow chamber wall comprises at least one hollow channel. The hollow channel may for example be provided for absorbing impact energy by means of plastic deformation. The hollow channel further increases the rigidity of the hollow chamber wall. The hollow channel may also be used as a fluid channel in order to control the temperature of the battery module, for example to heat or cool same.

In one example, each hollow chamber wall comprises a plurality of superimposed hollow channels. As a result, the stability of the hollow chamber wall is further increased. Furthermore, the plurality of walls that divide the superimposed hollow channels produces an enhanced energy-absorption capacity and results in more uniform, targeted deformation in the event of a crash.

In one example, a fluid for controlling the temperature of the electric battery module can flow through the at least one hollow channel, the battery tray comprising hollow channels for controlling the temperature of the electric battery module and the at least one hollow channel being provided for distributing fluid to hollow channels of the battery tray. In this way, a heat exchanger can be efficiently co-extruded at least in part.

In one example, the at least one hollow channel is sealed off in a fluid-tight manner on one side and/or the at least one hollow channel comprises at least one fluid connection piece or a plurality of fluid connection pieces for exposing the hollow channel to fluid.

In one example, each hollow chamber wall comprises at least one projection, in particular a hollow projection, which extends along the relevant hollow chamber wall and is remote from the base plate. The projection points outwards and may for example be used to absorb the impact energy.

In one example, each hollow chamber wall extends in a straight line or so as to be bent around corner edges of the base plate. In this way, different geometric shapes of the hollow chamber walls can be produced on the edge of the base plate.

In one example, the base plate is formed from solid material and/or is formed as part of a sandwich structure that is joined in a fluid tight manner or as a hollow profile base plate comprising a plurality of hollow channels. The battery tray profile can in this case be manufactured entirely from metal, for example aluminum.

In one example, a fluid can flow through the plurality of hollow channels in order to control the temperature of the electric battery tray. As a result, a heat exchanger can be efficiently integrated at least in part in the battery tray.

In one example, the hollow chamber walls and/or the base plate, in particular the walls in the base plate, have at least two different wall thicknesses.

On account of the different wall thicknesses in the hollow chambers and/or in the base plate, it is possible to produce the battery tray profile in a more efficient manner, in particular on account of optimized reshaping or stretching. The different wall thicknesses may additionally be used as functional surfaces for threads or integral bond connections such as welding, for example.

In one example, the base plate comprises at least one base reinforcement, the base reinforcement comprising a plurality of beads, in particular longitudinal beads, transverse beads, diagonal beads and/or intermittent diamond-shaped beads. The information relating to the direction of the beads is based on a plan view of the base plate.

By means of the base reinforcement of the base plate, in particular the beads, the base plate can be prevented from sagging.

According to a second aspect, the disclosure relates to a battery tray for holding an electric battery module of a vehicle, comprising the battery tray profile according to the first aspect, the base plate of the battery tray profile being stretched at least in part.

In one example, the battery tray comprises additional hollow chamber walls, which rise from the base plate, the hollow chamber walls and at least two additional hollow chamber walls forming a peripheral side frame of the battery tray. The additional hollow chamber walls may be connected to the base plate by means, for example, of an integral bond. In this way, a peripherally delimited receiving surface of the base plate or battery tray is provided for battery modules in a production-efficient manner.

In another example, the battery tray comprises at least one separating wall, which is connected to one of the hollow chamber walls and/or additional hollow chamber walls of the peripheral side frame, the at least one separating wall delimiting a receiving region for receiving at least one battery module.

In one example, the battery tray comprises an additional battery tray profile, for example according to the first aspect, the base plates of the battery tray profile and of the additional battery tray profile forming a common base plate, additional hollow chamber walls being provided which rise from the common base plate, and the battery tray comprising a peripheral side frame that is formed by the hollow chamber walls.

The battery tray profiles may be identical in design and may provide an even larger base plate in a particularly production-efficient manner by being joined. The additional hollow chamber walls, which are not extruded together with the relevant base plate, may be connected to the relevant base plate and/or hollow chamber wall by means of an integral connection, such as welding.

According to a third aspect, the disclosure relates to a battery tray arrangement comprising a battery tray according to the second aspect, and comprising a heat exchanger through which a fluid can flow for controlling the temperature of the at least one electric battery module, the heat exchanger being connected to the base plate of the battery tray.

In one example, the heat exchanger is connected, in particular integrally bonded, to an underside of the base plate that is remote from the receiving surface of the base plate. In particular, the heat exchanger comprises a contact surface which is adhesively bonded to the underside of the base plate.

In one example, the battery tray arrangement comprises a base protection plate, the heat exchanger being arranged between the base plate of the battery tray and the base protection plate. In this case, the heat exchanger is in particular adhesively bonded to the base plate and/or base protection plate.

In one example, the heat exchanger comprises at least one fluid-conveying hollow fluid channel, the hollow fluid channel comprising a fluid inlet opening for introducing fluid into the hollow fluid channel and a fluid outlet opening for discharging fluid from the hollow fluid channel. In particular, the fluid inlet opening and the fluid outlet opening are arranged on opposite sides of the heat exchanger.

In one example, the fluid inlet opening and/or the fluid outlet opening is/are closed by means of a fluid stopper.

According to a fourth aspect, the disclosure relates to a method for producing a battery tray profile, in particular according to the first aspect, for a battery tray for holding at least one electric battery module of a motor vehicle, said method comprising: extruding a base plate for receiving an electric battery module, the base plate comprising at least one extruded curve, the extruded curve being stretchable; and extruding a hollow profile wall, which rises from the base plate and is integrally formed with the base plate; the base plate and the hollow profile wall being extruded in an extrusion process in order to obtain the battery tray profile.

According to a fifth aspect, the disclosure relates to a method for producing a battery tray from the battery tray profile according to the first aspect, the battery tray profile comprising a base plate for receiving the electric battery module, the base plate comprising at least one extruded curve, the extruded curve being stretchable, and said battery tray profile comprising a hollow chamber wall which rises from the base plate and is integrally formed with the base plate, said method comprising: stretching the extruded curve in order to obtain a mounting surface for receiving the electric battery module.

In one example, the method comprises an additional method step after stretching of the extruded curve: further stretching the base plate in order to reduce residual stresses in the mounting surface, the further stretching being carried out in particular along a longitudinal axis of the base plate and/or along a transverse axis of the base plate that extends transversely to the longitudinal axis.

By means of the further stretching, in particular sizing, of the base plate, in addition to reducing residual stresses in the mounting surface, uniform residual compressive stress can also be ensured in the base plate by means of linear springback.

According to one example, the method comprises an additional method step: introducing base reinforcement into the base plate, the introduction of the base reinforcement being carried out in particular after stretching of the extruded curve and/or after further stretching of the extruded curve.

In one example, the base reinforcement comprises a plurality of beads, in particular longitudinal beads, transverse beads, diagonal beads and/or diamond-shaped beads.

By means of the base reinforcement of the base plate, in particular the beads, the base plate can be prevented from sagging. The beads can in particular be introduced into the base plate by means of a pressing procedure.

In one example, a second battery tray profile according to the first aspect is extruded and stretched, and subsequently the two base plates are integrally bonded to one another directly or via a wall. In this case, they may be identical parts which together form a side frame and base plate of the battery tray.

BRIEF DESCRIPTION OF THE DRAWINGS

Examples of the present disclosure are described with reference to the accompanying drawings.

FIGS. 6*a*, 6*b* show examples of the hollow chamber walls;
FIGS. 7*a*, 7*b* show examples of the battery tray;
FIG. 8 shows the battery tray in one example;
FIG. 9 shows the battery tray profile in one example;
FIG. 10 shows the battery tray profile in one example;
FIG. 11 shows the battery tray in one example;
FIG. 12 shows the battery tray profile in one example;
FIG. 14 shows the battery tray profile in one example;
FIG. 15 shows the battery tray in one example;
FIG. 16 shows the battery tray profile in one example;
FIGS. 17*a*-17*h* show the battery tray in one example;
FIG. 18 shows the battery tray in one example;
FIG. 19 shows the battery tray profile in one example;
and
FIG. 20 shows the battery tray profile in one example.

DETAILED DESCRIPTION

Figure 1:
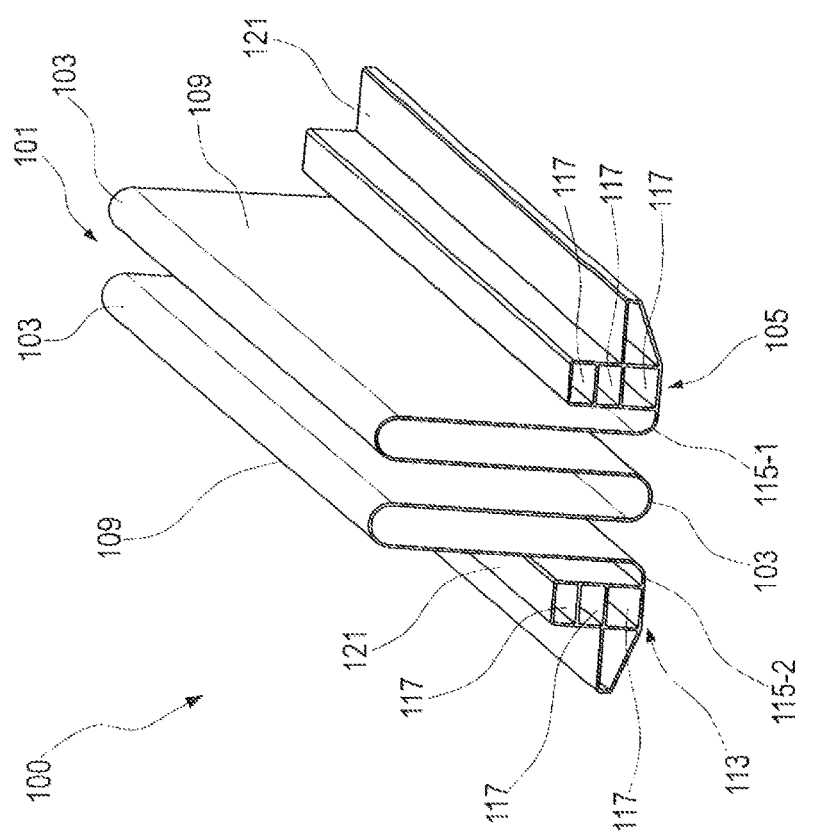
FIG. 1 shows a battery tray profile in one example.

FIG. 1 shows a battery tray profile 100 for a battery tray for holding at least one electric battery module of a vehicle in one example.

The battery tray profile 100 comprises a base plate 101 for receiving the electric battery module, the base plate 101 comprising at least one extruded curve 103, the extruded curve 103 being stretchable, and said battery tray profile comprising a hollow chamber wall 105 which rises from the base plate 101 and is integrally formed with the base plate 101.

The battery tray profile 100 further comprises an additional hollow chamber wall 113, which rises from the base plate 101. The hollow chamber wall 105 and the additional hollow chamber wall 113 are preferably identically formed. The hollow profile wall 105 is in this case the side frame of the battery tray 200, which side frame may for example be screwed to sillboards, for example, of the motor vehicle.

In one example, the hollow chamber walls 105, 113 are arranged on opposing portions 115-1, 115-2, in particular on opposing edges, of the base plate 101, and laterally delimit the base plate 101.

However, the hollow chamber walls 105, 113 may be arranged at an angle to one another, in particular at a right angle.

The hollow chamber walls 105, 113 may further define receiving regions of the base plate 101 for receiving the battery modules and rise from the center of the base plate 101, for example.

Each hollow chamber wall 105, 113 may further comprise at least one projection 121, in particular a hollow projection, which extends along the relevant hollow chamber wall 105, 113 and is remote from the base plate 101. Each projection 121 may be used to hold the battery tray 200 produced from the battery tray profile 100 by means of stretching on a vehicle component, in particular sillboard. For this purpose, the projections 121 may comprise openings for screw connections.

In one example, the hollow chamber walls 105, 113 are plastically deformable and can therefore absorb impact energy.

In the example shown in FIG. 1, the base plate 101 is extruded so as to be folded and comprises a plurality of folds 109, to which the curves 103 are assigned. The folds 109 or waves are extruded for example in parallel and are provided for reducing an extruded construction space of the battery tray profile 100. After the folds 109 are stretched, a battery tray 200 is produced having a receiving surface for the battery modules (not shown in FIG. 1) that is provided by means of the stretched base plate 101. In particular, a battery tray having a base plate and a side frame formed on both sides but integrally therewith is produced in this manner.

The battery tray profile 100 is thus provided as a semi-finished product or intermediate product in order to provide planar base plates 101 in a cost-efficient manner by means of extrusion.

In one example, the folds 109 are stressfree in the extruded state.

In the example shown in FIG. 1, each hollow chamber wall 105, 113 comprises a plurality of superimposed hollow channels 117, which extend in parallel with the extrusion direction of the folds 109 or along the folds 109, for example.

The hollow channels 117 are designed to be fluid-tight, with the exception of possible openings for screw connections, and can be supplied with a fluid in order to control the temperature of the electric battery module.

In another example, at least one of the hollow channels 117 may be used as a collection line or distribution line for distributing fluid to hollow channels of the battery tray. For this purpose, in one example (not shown in FIG. 1), the base plate 101 may comprise hollow channels which extend, for example, in parallel with the folds 113 or along the folds 103 or transversely to the folds 113. The collection line then correspondingly extends either transversely to the folds 113 or along or in parallel with the folds 119.

The battery tray profile 100 shown in FIG. 1 is preferably manufactured as one piece, in particular extruded.

In one example, the battery tray profile 100 may also be regarded as the battery tray 200 in the non-stretched state, i.e. having the curve 103, the receiving surface of which battery tray for battery tray modules can be enlarged by stretching the base plate 101.

Figure 2:
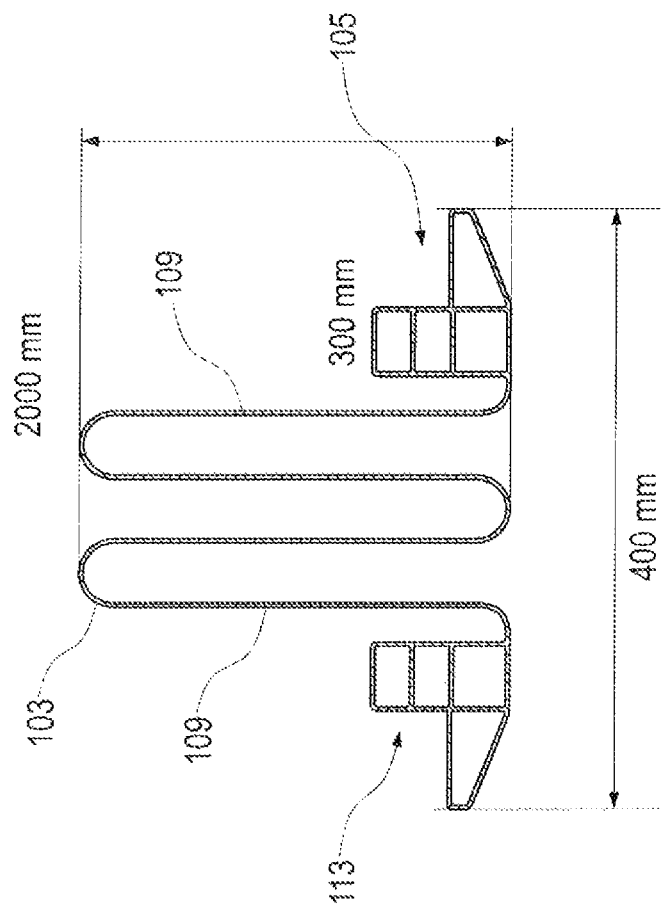
FIG. 2 is a cross-sectional view of the battery tray profile in one example.

FIG. 2 shows a cross-section of the battery tray profile 100 having example dimensions according to one example. The loading may for example be 10 to 25 kg/m at a length of 2000 mm. The length of 2000 mm can be achieved by stretching the folds 109.

Figure 3:
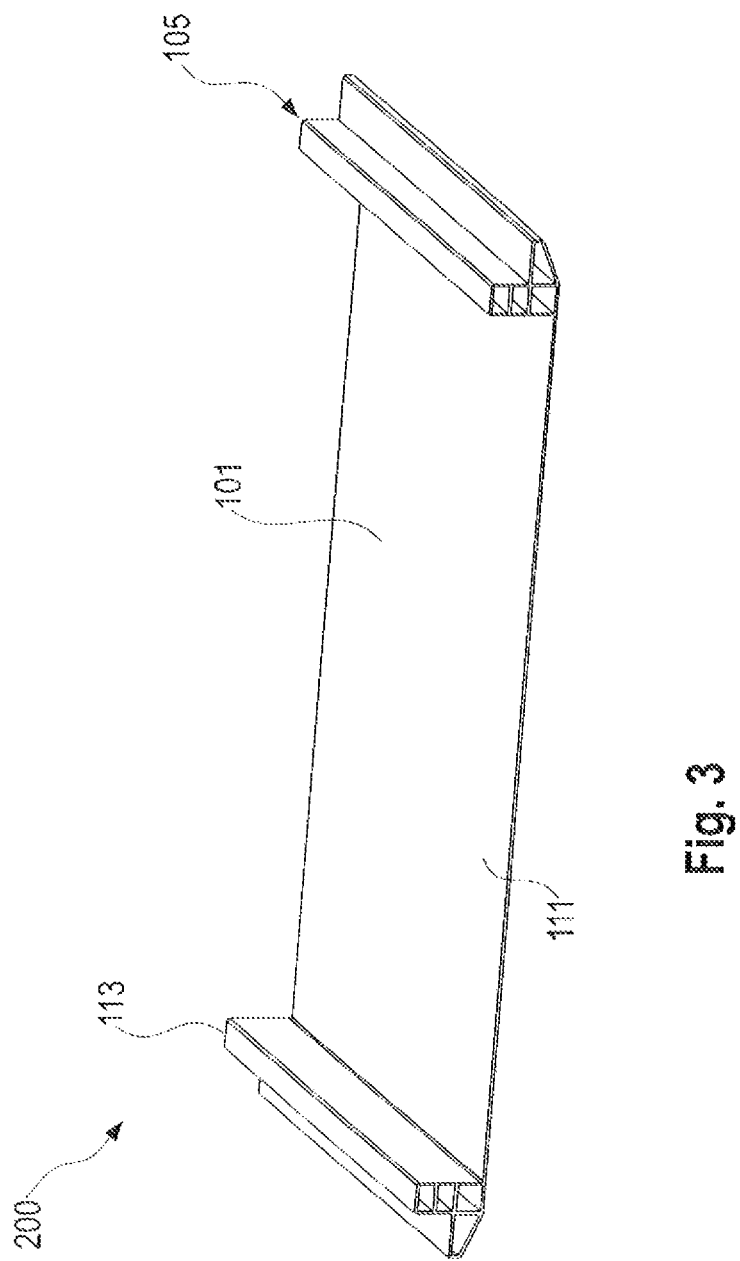
FIG. 3 shows the battery tray in one example.

FIG. 3 shows a battery tray 200 for holding an electric battery module of a vehicle, which battery tray results from stretching the base plate 101 of the battery tray profile 100. The base plate 101 may be flat or wavy after stretching.

The base plate 101 can be stretched by pulling the folds 109 according to FIG. 1 apart, completely or at least in part.

In one example, stretching of the base plate 101 may additionally bring about elongation of the base plate 101 by a further 2%, for example. In one example, the base plate may be additionally plastically elongated by 10%-12%. Overstretching of this kind in the plastic range of the material unfailingly causes springback or enlargement of the folds or wave amplitude.

In one example, the hollow chamber wall 105 delimits a receiving region 111 on the base plate 101 for receiving the electric battery module.

Figure 4:
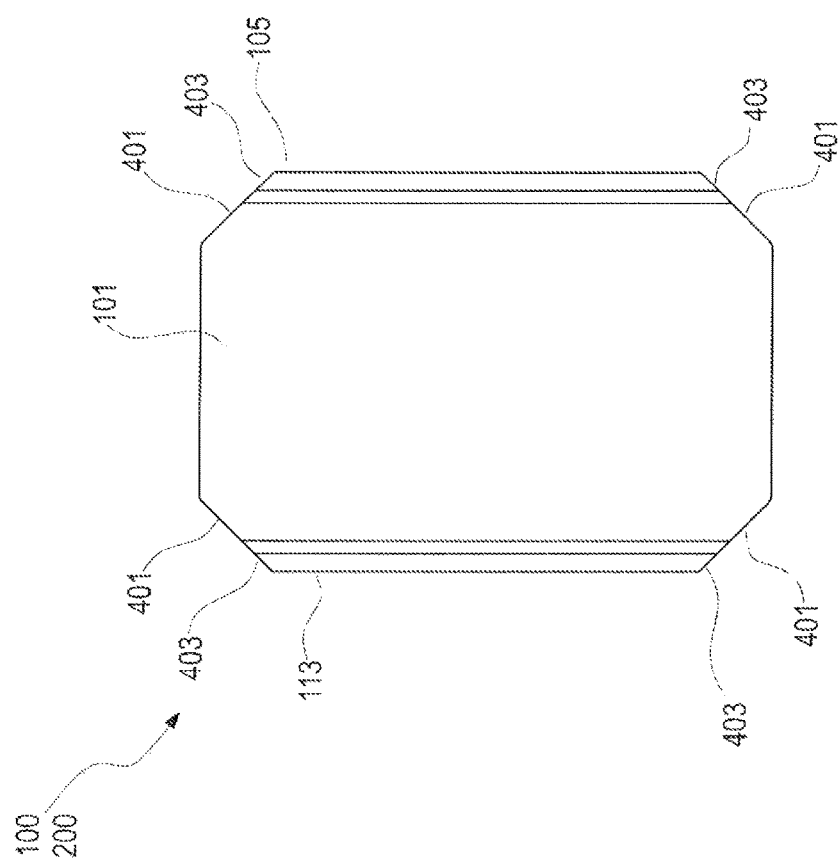
FIG. 4 shows examples of the battery tray.
Figure 5:
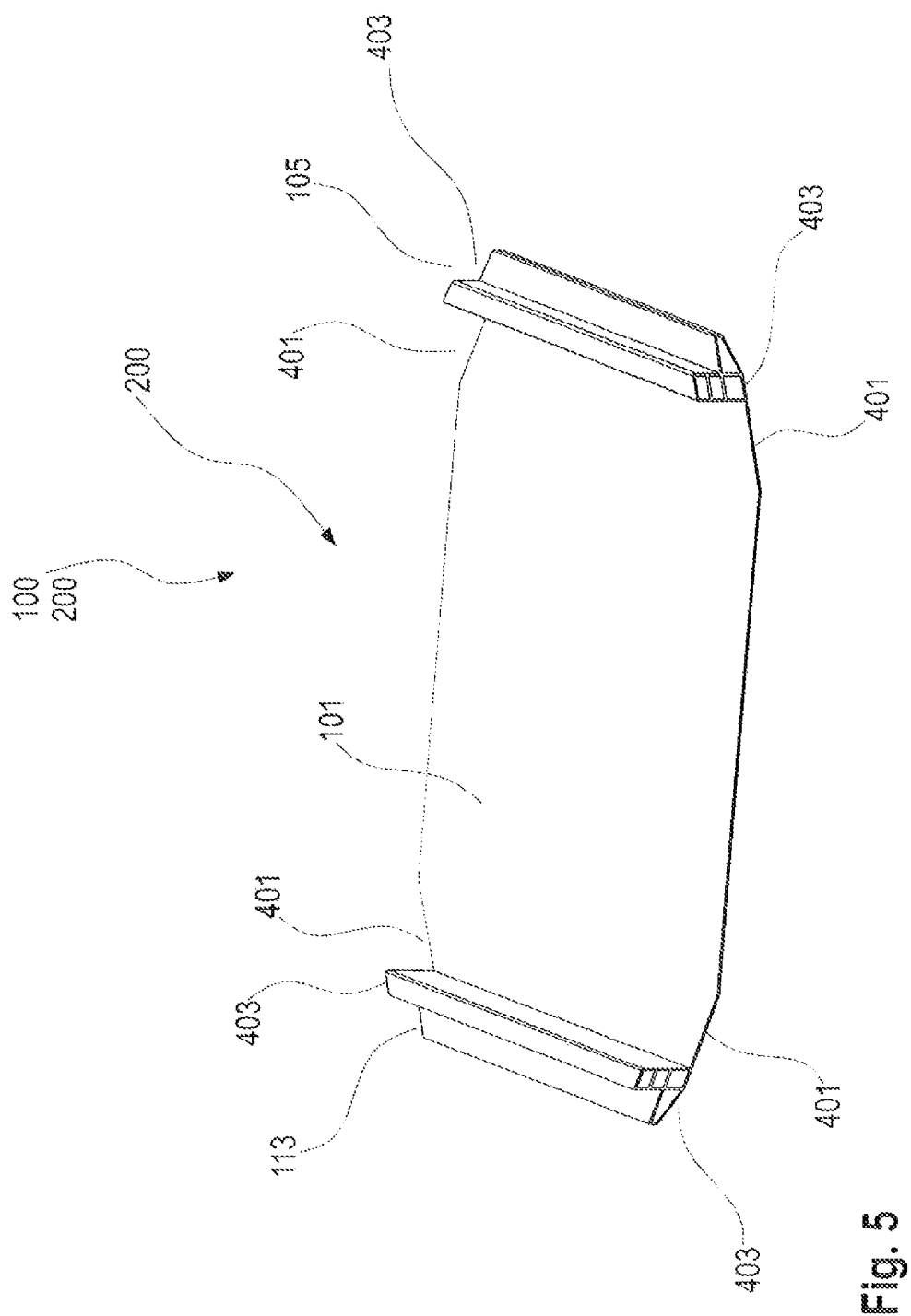
FIG. 5 shows examples of the battery tray.

Further examples of the battery tray extrusion profile 100 or battery tray 200 are shown in FIGS. 4 and 5.

In the example shown in FIG. 4, the hollow chamber walls 105, 113 are arranged opposite one another on the longitudinal sides of the stretched base plate 101. The base plate 101 further comprises chamfered corners 401, the chamfers of which also include the hollow chamber walls 105, 113. The hollow chamber walls 105, 113 therefore comprise chamfers 403 in the region of the corners 401, which chamfers follow the chamfer course of the corners 401. The chamfers 403 may for example be 45°.

In the example shown in FIG. 5, the hollow chamber walls 105, 113 are arranged opposite one another on the longitudinal sides of the stretched base plate 101. The base plate 101 further comprises chamfered corners 401, the chamfer of which also includes the hollow chamber walls 105, 113. The hollow chamber walls 105, 113 therefore comprise chamfers 403 in the region of the corners 401, which chamfers follow the chamfer course of the corners 401.

Another hollow chamber wall 701 is shown in FIGS. 6a and 6b in various views as a separately manufactured component. A second, additional hollow chamber wall 703 arranged opposite on the battery tray may be formed correspondingly.

The hollow chamber wall 701 shown in FIG. 6a is bent at the ends 601, 603 in order to engage around the corners 401 of the base plate 101, for example. Optionally, the hollow chamber wall 701 comprises chamfers 605, 607 that can receive optional chamfers of the base plate 101.

FIG. 6b is a plan view of the hollow chamber wall 701 from FIG. 6a.

The example of the additional hollow chamber wall 701 when mounted on the battery tray 101 is shown in FIGS. 7a and 7b. The additional hollow chamber walls 701, 703 are shown schematically in these figures only on one side of the base plate, but are correspondingly arranged on both sides of the base plate 101, and are integrally bonded to the base plate 101 and/or to the hollow chamber wall 105, 113 of the battery tray profile, for example welded, soldered or adhesively bonded thereto. In this way, a side frame that surrounds the entire battery tray 200 can be produced.

In the examples shown in FIGS. 7a and 7b, the hollow chamber walls 105 and 113 are arranged on the long sides of the base plate 101, and the additional hollow chamber wall 701 is arranged on a short side of the base plate. At least one additional hollow chamber wall 703 may be correspondingly arranged on the opposite short side.

In an alternative example, however, the hollow chamber walls 105, 113 are arranged on the long sides of the base plate 101, and the additional hollow chamber walls 701, 703, in contrast, are arranged on the short sides of the base plate.

In one example, the hollow chamber walls 105, 113, 701, 703 are designed to be identical in cross-section.

FIG. 8 shows an example of the battery tray 200 in which, as an addition to the example shown in FIG. 7a, separating walls 801 are provided which extend between the hollow chamber walls 105, 113. The separating walls 801 therefore divide the base plate 101 into receiving regions 803 or receiving recesses for receiving battery modules (not shown in FIG. 8).

However, a separating wall 801 may also extend between the hollow walls 701, 703 in an example not shown here.

Additional separating walls may be provided perpendicularly to the separating walls 801 in order to provide additional receiving regions 803.

The walls 801 may consist of solid material, for example metal or plastics material, or may be designed as hollow profiles consisting in particular of an aluminum alloy.

In addition, the walls 801 may be integrally bonded or frictionally connected to the base plate 101 and/or to at least one of the hollow chamber walls 105, 113, 701, 703.

FIG. 9 shows an example of the battery tray profile 100, in which the base plate 101 is extruded into an arc shape, in particular into a rectangular shape having rounded corners, which form the curves 103. The base plate 101 may be extruded so as to be at least partially circumferential or folded over or extruded into an O-shape or U-shape.

In order to stretch the base plate 101 to obtain the battery tray 200, an end of the base plate 101 is optionally provided with a co-extruded flange 1001. The flange 1001 functions as a point of application for a stretching force for unfolding or stretching the base plate 101. In addition, two hollow channels 117 are simultaneously formed in a region of the battery tray profile 100 that is not intended to be stretched.

In the non-stretched state, in one example, the battery tray profile 100 has the dimensions of approximately 100×130 mm.

FIG. 10 shows an example of the battery tray profile 100, in which the base plate 101 is extruded into a V-shape or comprises a single fold 109. A flange 1001 is provided on the end of the base plate 101 that is remote from the hollow chamber wall 105, which flange functions as a point of application for a stretching force for unfolding or stretching the base plate.

In the examples shown in FIGS. 9 and 10, no additional hollow chamber wall is extruded opposite the hollow chamber wall 105, and therefore a plurality, in particular two, identical battery tray profiles 100 can form the battery tray 200 together with side frames 105, 113 and base plate 101.

The flange 1001 can be removed after stretching or may be designed as a double-sided point of application for the stretching.

In one example, however, instead of the flange 1001, the hollow chamber wall 113 shown by way of example in FIG. 1 may in each case be extruded.

The extruded shapes of the base plate 101 shown in FIGS. 9 and 10 may be provided in all examples of the battery tray profile 100.

The fold 109 has the dimensions of approximately 200 mm×130 mm, for example.

A battery tray 200 is shown in FIG. 11 which is produced by stretching the battery tray profile 100 according to the examples shown in FIGS. 9 and 10.

As shown in FIG. 11, the flange 1001 is shaped into a projection 1201, which forms a step. As a result, the battery tray profile 100 can be welded or adhesively bonded to an additional battery tray profile so as to overlap therewith, in order to form a flat support surface for the battery module.

FIG. 12 shows the battery tray profile 100 in one example, in which the base plate is extruded into an omega shape. As a result, the fold 109 has an omega-shaped cross-section comprising the curve 103, which can be in the shape of an arc of a circle.

In the example shown in FIG. 12, flanges 1001 are arranged on both opposing sides of the base plate 101, which flanges are provided as points of application for stretching the base plate 101.

The hollow chamber wall 105 rises from the base plate 101 and is spaced apart from the flange 1010 and/or centrally positioned, as a result of which a wall can be formed which divides the base plate 101. In contrast to the example from FIG. 1, for example, the hollow chamber wall 105 is thus arranged so as to be offset towards the center of the base plate 101.

Optionally, in FIG. 12, an additional hollow chamber wall 1301 is extruded which also extends centrally and/or at a distance from the flange 1001. Both hollow chamber walls 1301 may form inner cross-members of the battery tray without involving additional mounting or handling outlay.

By means of the arrangements of the hollow chamber walls 105, 1301, receiving regions for battery tray modules may be produced on the base plate 101.

In the example shown in FIG. 12, the opposing lateral ends 1303, 1305 of the base plate that are remote from one another are extruded so as to be angled and thus so as to face one another. An overall M-shape of the extruded base plate 101 results from this. The hollow chamber walls 105, 1301 are in each case located between the remote lateral ends 1303, 1305 and the fold 109.

The hollow chamber walls 105, 1301 may have the same or different widths.

The examples above apply analogously to all presently described examples of the battery tray profile 100.

In order to stretch the battery tray profile 100 shown in FIG. 12, the opposing flanges 1001 can be clamped in a tool and subjected to a stretching force. In this case, firstly the fold 109, for example, can be unfolded or stretched. Subsequently, the angled lateral ends 1303, 1305 can be stretched. However, the base plate 101 can be stretched in a work process by applying a stretching force to the flanges 1001 that acts in the opposite direction in each case.

Subsequently, the flanges 1001 can be cut off or reshaped.

The extruded shape of the battery tray profile 100 shown in FIG. 12 can be achieved in all examples of the battery tray profile 100.

Figure 13:
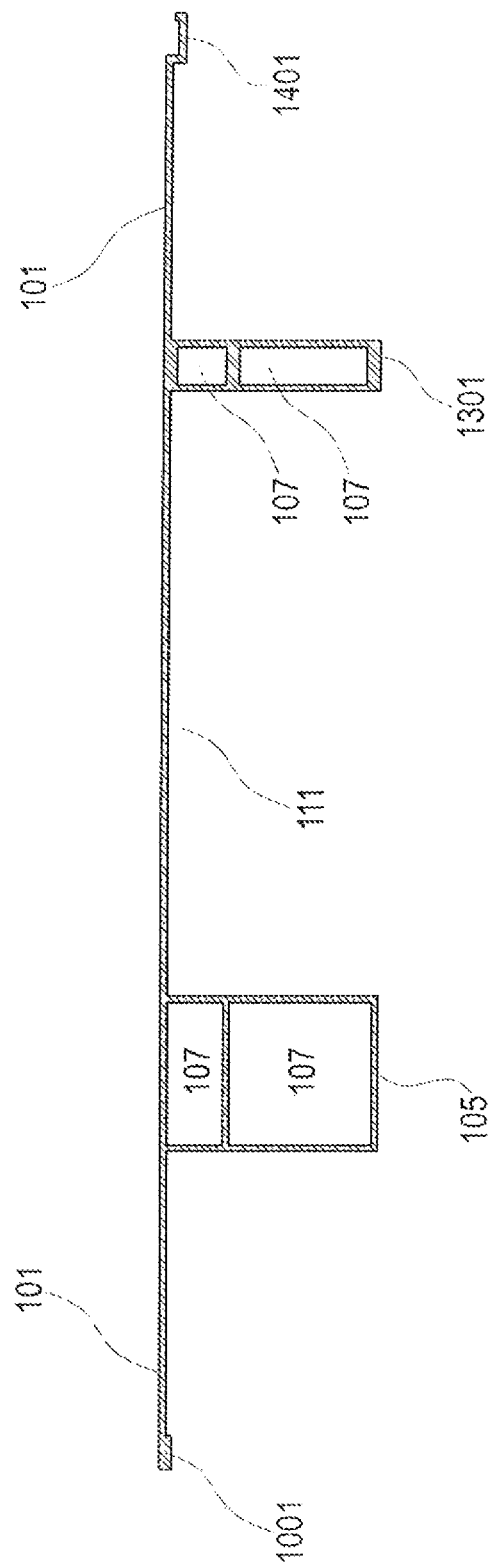
FIG. 13 shows the battery tray in one example.

FIG. 13 shows the battery tray 200, which is produced by stretching the battery tray profile 100 from FIG. 12. In this case, one of the flanges 1001 has been reshaped into a step-shaped projection 1401. As a result, an undercut is produced for an additional battery tray profile 100 that comprises a flange 1001 shaped in a complementary manner.

In one example, the base plate 101 of the battery tray profile 100 is made of solid material, for example an aluminum alloy.

The base plate 101 may enclose one or more cavities or be extruded as a hollow profile.

In one example, the hollow chamber wall 105 delimits the receiving region 111 on the base plate 101 for receiving the electric battery module.

FIG. 14 shows an example of the battery tray profile 100 in which the base plate 101 encloses one or more cavities 1501, for example in the manner of a sandwich. For this purpose, the base plate 101 may comprise opposing base walls 1503, 1505 which enclose the cavity 1501. As a result, a double base can be produced. In this case, the hollow chamber walls 105, 113 are integrated.

The cavity 1501 may be used to control the temperature, for example cool, the battery module (not shown) or the battery tray 100 that can be produced by stretching the battery tray profile 100. For this purpose, a fluid, for example air or coolant, can flow through the cavity 1501.

In one example, the cavity 1501 is provided for insulating the battery tray 100 against heat or cold.

In one example, at least one of the hollow channels 117 can be fluidically connected to the cavity 1501 in order to supply the fluid to the cavity 1501 or to discharge said fluid from the cavity 1501.

The cavity 1501 may extend in a planar manner between the base walls 1503, 1505.

In one example, a plurality of cavities 1501 are extruded between the base walls 1503, 1505, which cavities extend between the hollow chamber walls 105 and 113, more or less in parallel with the drawing plane, and form hollow channels. A fluid can flow through the cavities 1501 in order to control the temperature of the battery module (not shown) and may for example form a heat exchanger.

The base plate 101 may comprise one or more folds, for example. In this case, one of the curves 1507 that is assigned to the outer base wall 1505 in the region of the folding of the fold 109 may be flattened. As a result, a flat stretch profile of the base plate 101 can be produced after the battery tray profile 100 is stretched.

FIG. 15 shows an example of the battery tray 200, which is produced by stretching the battery tray profile 100 shown in FIG. 14.

FIG. 16 shows an example of the battery tray profile 100 in which, in contrast to the example shown in FIG. 14, parallel hollow channels 1701 are formed between the base walls 1503, 1505 of the base plate 101, which hollow channels are in each case separated from one another in a fluid-tight manner by means of a partition 1703.

Figure 17G:
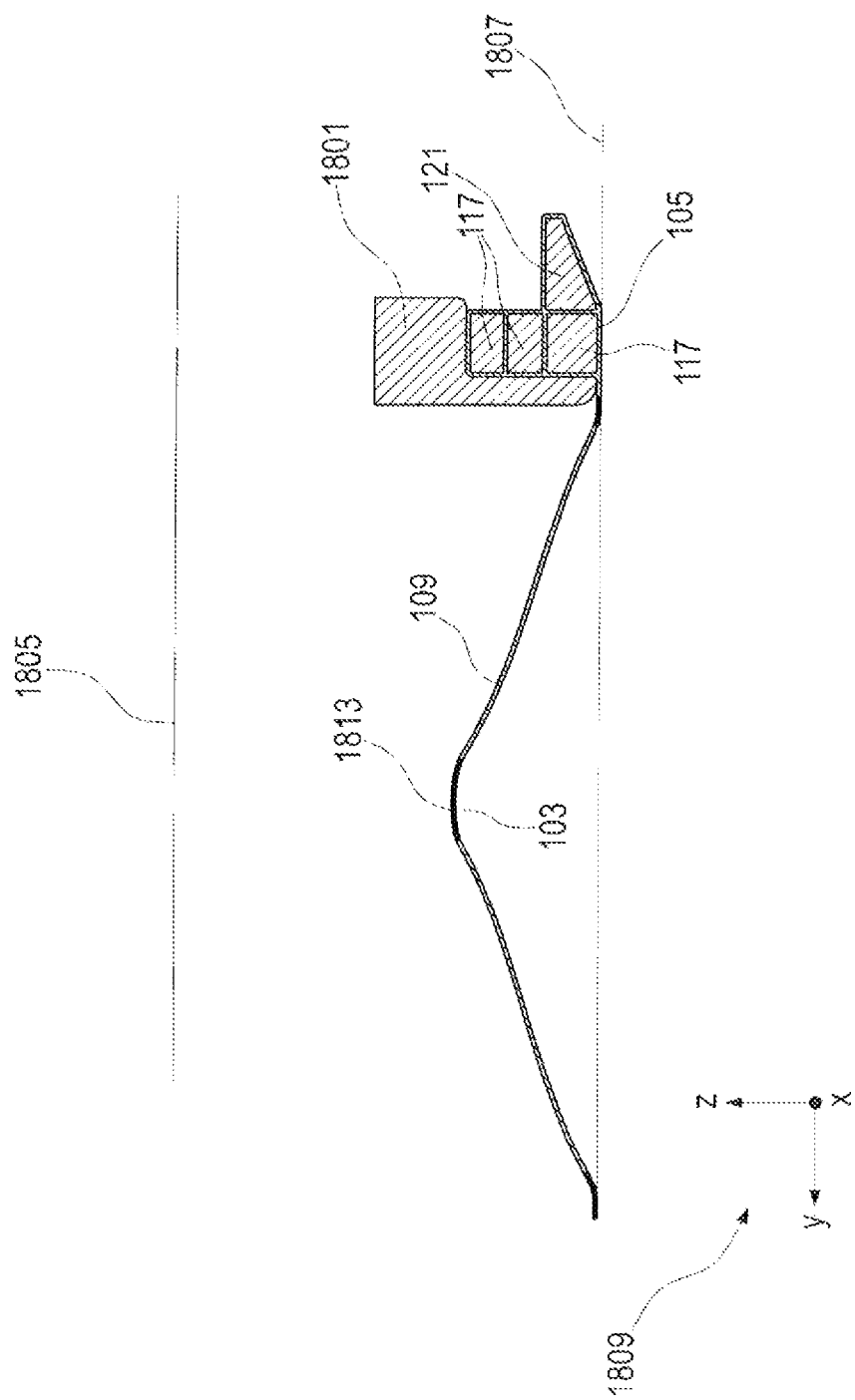

FIG. 17a schematically shows an example of the battery tray 200 which is produced after the battery tray profile 100 is stretched.

In contrast to the example described in FIG. 14, the parallel hollow channels 1701 extend for example in parallel with the hollow chamber walls 105, 113. The partitions 1703 increase the load-bearing capacity of the base plate or battery tray 200.

The parallel hollow channels 1701 can be supplied with fluid in parallel or in series, which makes it possible to control the temperature, for example heat or cool, the battery tray module (not shown).

In one example, at least one of the hollow channels 117 may be fluidically connected to the hollow channels 1701 in order to distribute the fluid to the hollow channels 1701. For this purpose, the hollow channels, which are open on the end face, may in each case be provided with a fluid connection piece in order to fluidically connect the hollow channels 1701 to the hollow channel 117.

In one example, a fluid collection line (not shown), for example a pipe, which distributes the fluid to the hollow channels 1701 that are open on the end face, may be provided on the end face of the base plate 101 after stretching to form the battery tray 200, which is shown by way of example in FIG. 17. For this purpose, the hollow channels 1701 may be connected to the fluid collection line by means of fluid connection pieces.

In one example, the fluid collection line may be co-extruded, for example as a hollow channel that extends transversely to the hollow channels 1701 and is fluidically connected thereto.

The battery tray profile 100 is preferably produced in an extrusion process using an extrusion die, which predefines the shape of the base plate 101. The battery tray 200 is obtained by stretching the base plate of the battery tray profile.

The base plate 101 can be stretched by smooth-pressing the base plate 101 and/or by drawing out the base plate 101.

FIG. 17b to 17h, the stretching of the base plate 101 is shown in an example based on the example of the battery tray profile 100 from FIG. 1, in order to obtain the battery tray 200.

In one example, the battery tray profile 100 is inserted between an upper pressing plate 1805 and a lower pressing plate 1807 using mandrels 1801, 1803 inserted laterally between the relevant hollow chamber wall 105, 113.

The pressing plates 1805 and 1807 act on the base plate 101 preferably in the region of the curves 103. As a result, the base plate 101 is pressed flat or spread out. The pressing plates 1805 and 1807 may advantageously be used in a final plastic stretching step in particular, in order to ensure additional support and/or additional guidance. Furthermore, sizing can be carried out by means of the pressing plates 1805 and 1807 after the lateral tensile forces have been stopped.

Furthermore, the pressing plates 1805 and 1807 may advantageously be used to press the folds 109 flat, in particular in the case of a less steeply set fold angle, in order to stretch the base plate 101 by means of the pressing plates 1805 and 1807 alone or in combination with the lateral tensile forces, which act on the mandrels 180, 1803.

Lateral tensile forces may be applied to the mandrels 1801 and 1803 in order to apply a stretching force in each case to the base plate 101 and to stretch said base plate while flattening the fold 109 or wave.

For reasons of symmetry, the stretching of the base plate is shown in FIGS. 17c to 17h using the example of a fold 109 of the base plate 101 in relation to the coordinate system 1809.

Proceeding from the initial position according to FIG. 17c, in one example, a pressing force is exerted along the z-coordinate axis by means of the pressing plates 1805 and 1807. The upper pressing plate 1805 applies a pressing force to the curves 103 in the direction of the negative z-coordinate axis, the lower pressing plate 1807 applies a pressing force to the curves 103 in the direction of the negative z-coordinate axis. In this case, the pressing plates 1805, 1807 are brought together.

In one example, both pressing plates 1805 and 1807 may be driven along the z-coordinate axis. In another example, only one of the pressing plates 1805 or 1807 may be driven along the z-coordinate axis. The pressing plate 1805, 1807 that is passive in each case acts as a counterpress.

By applying pressure or a force to the base plate 103 along the z-coordinate axis, the fold 109 is, for example, continuously or gradually spread or stretched or widened, as shown in FIGS. 17d to 17h.

However, the pressing plates 1805 and 1807 may only be provided as guides, such that the base plate is drawn out exclusively by means of mandrels 1801, 1803. This example is shown in FIGS. 17c to 17g.

The stretching force or lateral tensile force, which is applied to the relevant mandrel 1801, 1803, may for example be 35 kN when using aluminum as the base material for the battery tray profile 101.

During stretching, the base plate 101 is compressed on the convex side and extended on the concave side in the region of the curves 103. This may result in regions 1813 of material stress, which can however be tolerated with regard to the strength of the stretched base plate 101.

In one example, the pressing plates 1805 and 1807 may be used after the base plate 101 has been stretched by means of the mandrels 1801 and 1803, in order to press the base plate 101 flat or to eliminate residual corrugation of the base plate 101 or to press below a threshold for the residual corrugation.

All of the previously described examples relate to examples of the battery tray profile 100 and battery tray 200 that can be combined with one another.

FIG. 18 shows another example of the battery tray 100, which is produced from the battery tray profile 100 shown in FIG. 12 using the previously described method.

FIG. 19 shows another example of the battery tray profile 100 and, in schematic superposition, of the battery tray 200 produced from the battery tray profile 100 by stretching the base plate 101. The stretched battery tray profile 101, together with at least two separately manufactured additional hollow chamber walls 105, 113, forms the battery tray 200 comprising a receiving surface or receiving space for at least one battery module, but preferably for a plurality of battery modules.

The base plate 101 is symmetrically shaped having a plurality of curves 103 and folds 109. In addition, the base plate 101 is extruded so as to be folded over along the axis of symmetry 2101. This produces a fir tree shape of the extruded base plate 101.

In one example, the height of the folds 109 may decrease with increasing distance from the relevant hollow chamber wall 105, 113 or the height thereof may be delimited by a radius of the circular path 2103 shown in FIG. 19. In this way, the curves 103 are arranged along the circular path 2103 and said circular path comes into contact with the apex of each curve. The circular path 2103 may for example be determined by an extrusion tool. As a result, a particularly compact extrusion arrangement can be used.

FIG. 20 shows another example of the battery tray profile 100 in which the base plate 101, in line with the example shown in FIG. 9, is extruded not only so as to have folds 109 but also so as to be in an arc shape, in particular a rectangular shape having rounded corners, which form the curves 103. As a result, the ends of the base plate 101 comprising the respective extruded hollow chamber walls 105, 113 are curled or folded over inwards. The base plate 101 may be extruded so as to be at least partially circumferential or folded over or extruded into an O-shape or U-shape. The base plate 101 is extruded so as to be folded over in a mirror-symmetrical manner on both sides of the axis of symmetry 2101.

In one example, the curves 101 of the base plate 101 shown in FIG. 20 are distributed along a circular path 2203 or arranged inside said circular path 2203. This produces an extrusion arrangement that is particularly efficient in terms of construction space. The circular path 2203 may for example be determined by a suitable extrusion tool.

In one example, the base plate 101 may further comprise folds 2205 that are additionally bent sideways or additionally folded over or turned over. For this purpose, in cross-section, the folds 2209 may be shaped in the manner of an appendix. This makes it possible to use the extrusion construction space in a particularly efficient manner.

The invention claimed is:

1. A battery tray profile for a battery tray that holds at least one electric battery module of a vehicle, comprising:
    a base plate configured to receive the at least one electric battery module, wherein the base plate comprises at least one extruded curve, wherein the at least one extruded curve is configured to be stretched; and
    a hollow chamber wall that rises from the base plate and is integrally extruded with the base plate;
    wherein the base plate comprises at least one extruded fold comprising the at least one extruded curve, wherein the extruded fold is configured to stretch into an arc shape, or wherein the base plate is curved into an arc shape.

2. The battery tray profile according to claim 1, wherein the at least one extruded curve is configured to stretch into a flat receiving surface configured to receive the electric battery module.

3. The battery tray profile according to claim 1, wherein a plurality of the extruded folds comprise parallel extrusions.

4. A battery tray profile for a battery tray that holds at least one electric battery module of a vehicle, comprising:
    a base plate configured to receive the at least one electric battery module, wherein the base plate comprises at least one extruded curve, wherein the at least one extruded curve is configured to be stretched; and
    a hollow chamber wall that rises from the base plate and is integrally extruded with the base plate, wherein the hollow chamber wall delimits a receiving region on the base plate configured to receive the electric battery module, or wherein the hollow chamber wall laterally delimits the base plate as a side frame.

5. A battery tray profile for a batter tray that holds at least one electric battery module of a vehicle, comprising:
    a base elate configured to receive the at least one electric battery module, wherein the base olate comprises at least one extruded curve, wherein the at least one extruded curve is configured to be stretched; and
    a hollow chamber wall that rises from the base olate and is integrally extruded with the base plate; and
    an additional hollow chamber wall that rises from the base plate or laterally delimits the base plate or divides the base plate, wherein the hollow chamber wall and the additional hollow chamber wall are arranged on opposing edges of the base plate or are arranged at a right angle to one another.

6. The battery tray profile according to claim 5, wherein the hollow chamber wall and the additional hollow chamber wall each comprise at least one hollow channel.

7. The battery tray profile according to claim 6, wherein the at least one hollow channel is superimposed.

8. The battery tray profile according to claim 5, wherein the hollow chamber wall and the additional hollow chamber wall each comprise at least one hollow projection that extends along the respective hollow chamber wall and is remote from the base plate.

9. The battery tray profile according to claim 1, wherein the hollow chamber wall and the additional hollow chamber wall each extend in a straight line or are configured to be bent around corner edges of the base plate.

10. A battery tray profile for a battery tray that holds at least one electric battery module of a vehicle, comprising:
    a base plate configured to receive the at least one electric battery module wherein the base plate comprises at least one extruded curve, wherein the at least one extruded curve is configured to be stretched; and
    a hollow chamber wall that rises from the base plate and is integrally extruded with the base plate;
    wherein the base plate is formed from a solid material or is formed as part of a sandwich structure that is joined in a fluid tight manner or as a hollow profile base plate comprising a plurality of hollow channels.

11. The battery tray profile according to claim 10, wherein a fluid is configured to flow through the plurality of hollow channels to control the temperature of the electric battery tray.

12. A battery tray profile for a battery tray that holds at least one electric battery module of a vehicle, comprising:
    a base plate configured to receive the at least one electric battery module, wherein the base plate comprises at least one extruded curve, wherein the at least one extruded curve is configured to be stretched; and
    a hollow chamber wall that rises from the base plate and is integrally extruded with the base plate, having at least two different wall thicknesses in the hollow chamber wall and an additional hollow chamber wall or in the base plate.

13. The battery tray profile according to claim 1, wherein the base plate of the battery tray profile is stretched at least in part.

14. The battery tray profile according to claim 13, comprising at least two additional hollow chamber walls that rise from the base plate, wherein the hollow chamber walls and the at least two additional hollow chamber walls form a peripheral side frame of the battery tray.

15. A battery tray arrangement, comprising:
    a battery tray profile comprising a base plate configured to receive at least one electric battery module, wherein the base plate comprises at least one extruded curve, wherein the at least one extruded curve is configured to be stretched, and a hollow chamber wall that rises from the base plate and is integrally extruded with the base plate;
    an additional battery tray profile comprising an additional base plate and at least one additional hollow chamber wall, wherein the base plate of the battery tray profile and the additional base plate of the additional battery tray profile form a common base plate, wherein the at least one additional hollow chamber wall rise from the common base plate, and wherein the battery tray comprises a peripheral side frame that is formed by the hollow chamber wall and the at least one additional hollow chamber wall.

16. The battery tray arrangement according to claim 15, further comprising:
   a heat exchanger configured to allow a fluid to flow through and to control the temperature of an electric battery module, wherein the heat exchanger is connected to the base plate of the battery tray.

17. A method for producing a battery tray profile for a battery tray that holds at least one electric battery module of a vehicle, comprising:
   extruding a base plate for receiving the electric battery module;
   extruding at least one curve in the base plate, wherein the at least one extruded curve is configured to be stretched;
   extruding a hollow profile wall that rises from the base plate and is integrally extruded with the base plate; and
   obtaining the battery tray profile from the extruding of the base plate and the hollow profile wall during an extrusion process, wherein the hollow profile wall delimits a receiving region on the base plate configured to receive the electric battery module, or wherein the hollow chamber wall laterally delimits the base olate as a side frame.

18. The method according to claim 17, further comprising:
   stretching the at least one extruded curve to obtain a mounting surface configured to receive the at least one electric battery module.

19. The method according to claim 18, further comprising:
   extruding a second battery tray profile comprising a second base plate;
   stretching the second battery tray profile; and
   integrally bonding the base plate and the second base plate to one another directly or via a wall.

* * * * *